United States Patent
Catreux et al.

(10) Patent No.: US 7,822,140 B2
(45) Date of Patent: Oct. 26, 2010

(54) MULTI-ANTENNA COMMUNICATION SYSTEMS UTILIZING RF-BASED AND BASEBAND SIGNAL WEIGHTING AND COMBINING

(75) Inventors: Severine Catreux, Cardiff, CA (US); Vinko Erceg, Cardiff, CA (US); Pieter Roux, San Diego, CA (US); Pieter Van Rooyen, San Diego, CA (US); Jack Winters, Middletown, NJ (US)

(73) Assignee: Broadcom Corporation, Irvine, CA (US)

( * ) Notice: Subject to any disclaimer, the term of this patent is extended or adjusted under 35 U.S.C. 154(b) by 1358 days.

(21) Appl. No.: 10/801,930

(22) Filed: Mar. 16, 2004

(65) Prior Publication Data

US 2006/0029146 A1 Feb. 9, 2006

Related U.S. Application Data

(60) Provisional application No. 60/456,023, filed on Mar. 17, 2003, provisional application No. 60/467,295, filed on May 1, 2003.

(51) Int. Cl.
*H04B 7/02* (2006.01)

(52) U.S. Cl. .................. 375/267; 375/260; 375/295; 375/306; 375/307; 375/309; 375/347

(58) Field of Classification Search ................. 375/299, 375/260, 267, 347, 146, 295–296, 304, 315, 375/695, 306–307, 309, 346; 455/101–107
See application file for complete search history.

(56) References Cited

U.S. PATENT DOCUMENTS

| | | | |
|---|---|---|---|
| 5,345,599 A | | 9/1994 | Paulraj et al. |
| 5,625,880 A | | 4/1997 | Goldburg et al. |
| 5,719,583 A | * | 2/1998 | Kanai .................... 342/378 |
| 5,809,422 A | * | 9/1998 | Raleigh et al. .......... 455/449 |
| 5,822,312 A | * | 10/1998 | Peach et al. ............ 370/323 |
| 5,834,972 A | * | 11/1998 | Schiemenz et al. ..... 330/124 R |
| 6,016,124 A | * | 1/2000 | Lo et al. ................ 342/373 |
| 6,192,256 B1 | * | 2/2001 | Whinnett ............... 375/267 |
| 6,373,433 B1 | * | 4/2002 | Espax et al. ............ 342/368 |
| 6,452,981 B1 | * | 9/2002 | Raleigh et al. .......... 375/299 |
| 6,590,532 B1 | * | 7/2003 | Ogawa et al. ........... 342/378 |
| 6,697,017 B1 | * | 2/2004 | Shmuel ................. 342/378 |
| 6,721,339 B2 | * | 4/2004 | Li et al. ................ 370/535 |
| 6,778,612 B1 | * | 8/2004 | Lozano et al. .......... 375/299 |
| 6,785,520 B2 | * | 8/2004 | Sugar et al. ............ 455/101 |
| 6,873,651 B2 | * | 3/2005 | Tesfai et al. ........... 375/219 |
| 6,888,809 B1 | * | 5/2005 | Foschini et al. ......... 370/334 |
| 6,891,516 B1 | * | 5/2005 | Saunders et al. ........ 343/895 |
| 7,024,166 B2 | * | 4/2006 | Wallace et al. .......... 455/101 |

(Continued)

*Primary Examiner*—Mohammad H Ghayour
*Assistant Examiner*—Sophia Vlahos
(74) *Attorney, Agent, or Firm*—McAndrews, Held & Malloy, Ltd.

(57) ABSTRACT

A receiver operatively coupled to an antenna structure capable of receiving a first plurality of RF signals is disclosed herein. The receiver includes an RF processing network operative to perform weighting and combining operations within the RF domain using the first plurality of RF signals so as to produce a second plurality of RF signals. Also provided is a downconverter configured to downconvert the second plurality of RF signals into a second plurality of down-converted signals. In alternate implementations certain of the weighting and combining operations are performed at baseband and the remainder effected within the RF domain. A transmitter of corresponding architecture is also disclosed.

23 Claims, 11 Drawing Sheets

U.S. PATENT DOCUMENTS

| | | | |
|---|---|---|---|
| 7,079,867 B2* | 7/2006 | Chun et al. | 455/562.1 |
| 7,110,468 B2* | 9/2006 | Kohno et al. | 375/295 |
| 7,236,537 B2* | 6/2007 | Hottinen et al. | 375/267 |
| 7,248,656 B2* | 7/2007 | da Silveira et al. | 375/346 |
| 2002/0126042 A1* | 9/2002 | Chang et al. | 342/354 |
| 2003/0043929 A1* | 3/2003 | Sampath | 375/267 |
| 2003/0045313 A1* | 3/2003 | Iwamatsu et al. | 455/513 |
| 2004/0095907 A1* | 5/2004 | Agee et al. | 370/334 |
| 2004/0165558 A1* | 8/2004 | Ling et al. | 370/334 |
| 2004/0208258 A1* | 10/2004 | Lozano et al. | 375/295 |

* cited by examiner

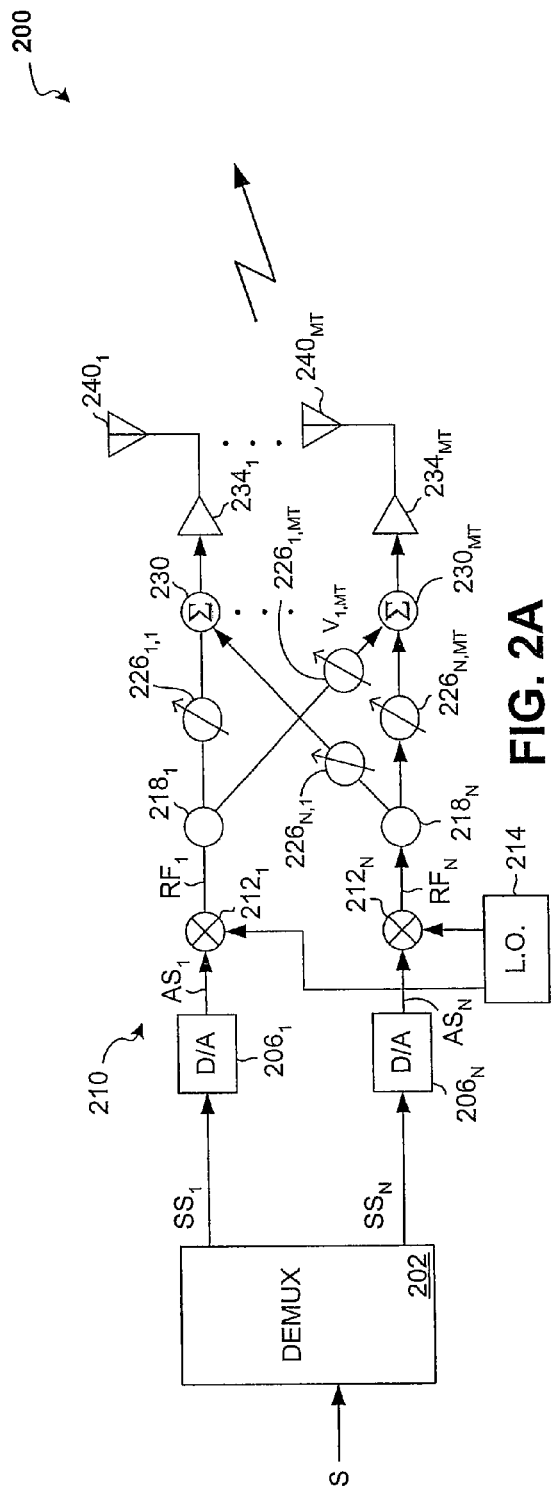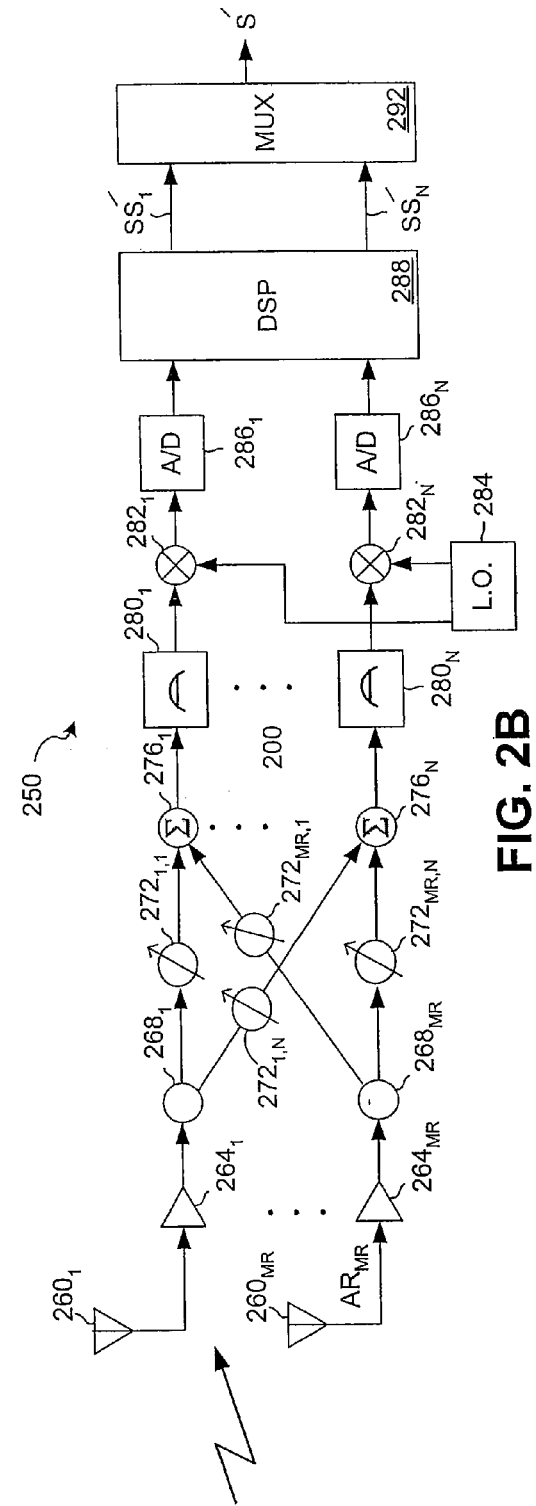
FIG. 2A
FIG. 2B

MULTI-ANTENNA COMMUNICATION SYSTEMS UTILIZING RF-BASED AND BASEBAND SIGNAL WEIGHTING AND COMBINING

CROSS-REFERENCE TO RELATED APPLICATIONS

This application claims priority under 35 U.S.C. §119(e) to U.S. Provisional Application Ser. No. 60/456,023, entitled SPATIALLY-MULTIPLEXED COMMUNICATION SYSTEM UTILIZING RF-BASED SIGNAL COMBINING, filed Mar. 17, 2003, and to U.S. Provisional Application Ser. No. 60/467,295, entitled WEIGHT GENERATION METHOD FOR RF SIGNAL COMBINING IN MULTI-ANTENNA COMMUNICATION SYSTEMS, filed May 1, 2003, each of which are herein incorporated by reference in their entirety.

FIELD OF THE INVENTION

The present invention relates to communication systems utilizing transmitters and receivers having multiple antenna elements. More particularly, the present invention relates to a system and method for utilizing RF-based signal weighting and combining, either exclusively or in combination with baseband signal weighting and combining, in connection with transmission and reception of signals using multi-antenna transmitters and receivers.

BACKGROUND OF THE INVENTION

Most current wireless communication systems are composed of nodes configured with a single transmit and receive antenna. However, for a wide range of wireless communication systems, it has been predicted that the performance, including capacity, may be substantially improved through the use of multiple transmit and/or multiple receive antennas. Such configurations form the basis of many so-called "smart" antenna techniques. Such techniques, coupled with space-time signal processing, can be utilized both to combat the deleterious effects of multipath fading of a desired incoming signal and to suppress interfering signals. In this way both the performance and capacity of digital wireless systems in existence or being deployed (e.g., CDMA-based systems, TDMA-based systems, WLAN systems, and OFDM-based systems such as IEEE 802.11a/g) may be improved.

The impairments to the performance of wireless systems of the type described above may be at least partially ameliorated by using multi-element antenna systems designed to introduce a diversity gain and suppress interference within the signal reception process. This has been described, for example, in "The Impact of Antenna Diversity On the Capacity of Wireless Communication Systems", by J. H. Winters et al, IEEE Transactions on Communications, vol. 42, No. 2/3/4, pages 1740-1751, February 1994. Such diversity gains improve system performance by mitigating multipath for more uniform coverage, increasing received signal-to-noise ratio (SNR) for greater range or reduced required transmit power, and providing more robustness against interference or permitting greater frequency reuse for higher capacity.

Within communication systems incorporating multi-antenna receivers, it is known that a set of M receive antennas are capable of nulling up to M-1 interferers. Accordingly, N signals may be simultaneously transmitted in the same bandwidth using N transmit antennas, with the transmitted signal then being separated into N respective signals by way of a set of N antennas deployed at the receiver. Systems of this type are generally referred to as multiple-input-multiple-output (MIMO) systems, and have been studied extensively. See, for example, "Optimum combining for indoor radio systems with multiple users," by J. H. Winters, IEEE Transactions on Communications, Vol. COM-35, No. 11, November 1987; "Capacity of Multi-Antenna Array Systems In Indoor Wireless Environment" by C. Chuah et al, Proceedings of Globecom '98 Sydney, Australia, IEEE 1998, pages 1894-1899 November 1998; and "Fading Correlation and Its Effect on the Capacity of Multi-Element Antenna Systems" by D. Shiu et al, IEEE Transactions on Communications vol. 48, No. 3, pages 502-513 March 2000.

One aspect of the attractiveness of multi-element antenna arrangements, particularly MIMOs, resides in the significant system capacity enhancements that can be achieved using these configurations. Under the assumption of perfect estimates of the applicable channel at the receiver, in a MIMO system with N transmit and N receive antenna elements, the received signal decomposes to N "spatially-multiplexed" independent channels. This results in an N-fold capacity increase relative to single-antenna systems. For a fixed overall transmitted power, the capacity offered by MIMOs scales linearly with the number of antenna elements. Specifically, it has been shown that with N transmit and N receive antennas an N-fold increase in the data rate over a single antenna system can be achieved without any increase in the total bandwidth or total transmit power. See, e.g., "On Limits of Wireless Communications in a Fading Environment When Using Multiple Antennas", by G. J. Foschini et al, Wireless Personal Communications, Kluwer Academic Publishers, vol. 6, No. 3, pages 311-335, March 1998. In experimental MIMO systems predicated upon N-fold spatial multiplexing, more than N antennas are often deployed at a given transmitter or receiver. This is because each additional antenna adds to the diversity gain and antenna gain and interference suppression applicable to all N spatially-multiplexed signals. See, e.g., "Simplified processing for high spectral efficiency wireless communication employing multi-element arrays", by G. J. Foschini, et al, IEEE Journal on Selected Areas in Communications, Volume: 17 Issue: 11, November 1999, pages 1841-1852.

Although increasing the number of transmit and/or receive antennas enhances various aspects of the performance of MIMO systems, the necessity of providing a separate RF chain for each transmit and receive antenna increases costs. Each RF chain is generally comprised a low noise amplifier, filter, downconverter, and analog to digital to converter (A/D), with the latter three devices typically being responsible for most of the cost of the RF chain. In certain existing single-antenna wireless receivers, the single required RF chain may account for in excess of 30% of the receiver's total cost. It is thus apparent that as the number of transmit and receive antennas increases, overall system cost and power consumption may dramatically increase. It would therefore be desirable to provide a technique for utilizing relatively larger numbers of transmit/receive antennas without proportionately increasing system costs and power consumption.

SUMMARY OF THE INVENTION

In summary, the present invention is directed in one aspect to a communication method in which a first plurality of spatially-multiplexed signals are received through a second plurality of receive antennas. The resulting second plurality of received signals are divided into a third plurality of divided signals and weighted, thereby forming a third plurality of weighted signals. The third plurality of weighted signals are then combined in order to form a fourth plurality of combined signals, which are then down-converted into a fourth plurality of down-converted signals.

The present invention also relates to a communication method pursuant to which an input signal is demultiplexed into a first plurality of demultiplexed signals. The first plurality of demultiplexed signals are upconverted into a first plurality of upconverted signals, which are then divided into a second plurality of divided signals. The second plurality of divided signals are weighted so as to form a second plurality of weighted signals, which are combined in order to form a third plurality of combined signals. The method also contemplates transmitting the third plurality of combined signals.

In another aspect, the present invention relates to a communication apparatus including an antenna structure for receiving a first plurality of spatially-multiplexed signals so as to form a second plurality of received signals. The apparatus further includes set of dividers for dividing the second plurality of received signals into a third plurality of divided signals. An arrangement of weighting elements capable of weighting the third plurality of divided signals and thereby form a third plurality of weighted signals is also provided. In addition, the apparatus includes an arrangement of combining elements capable of combining ones of the third plurality of weighted signals into a fourth plurality of combined signals. A downconverter is configured to downconvert the fourth plurality of combined signals into a fourth plurality of down-converted signals.

The present invention is also directed to a communication apparatus including a demultiplexer disposed to demultiplex an input signal into a first plurality of demultiplexed signals. An upconverter is operative to upconvert the first plurality of demultiplexed signals into a first plurality of upconverted signals. An arrangement of dividing elements capable of dividing the first plurality of upconverted signals into a second plurality of divided signals is also provided. The apparatus further includes an arrangement of weighting elements capable of weighting the second plurality of divided signals so as to form a second plurality of weighted signals. A combiner arrangement is provided for combining ones of the second plurality of weighted signals in order to form a third plurality of combined signals. The apparatus additionally includes an antenna structure for transmitting the third plurality of combined signals.

In another aspect, the invention relates to a communication apparatus operatively coupled to an antenna structure that is capable of receiving a first plurality of RF signals. The apparatus includes an RF processing network, coupled to the antenna structure, which is operative to perform weighting and combining operations within the RF domain using the first plurality of RF signals so as to produce a second plurality of RF signals. Also provided is a downconverter configured to downconvert the second plurality of RF signals into a second plurality of down-converted signals.

The present invention also pertains to a communication apparatus which includes a demultiplexer disposed to demultiplex an input signal into a first plurality of demultiplexed signals. An upconverter is operative to upconvert the first plurality of demultiplexed signals into a first plurality of RF signals. The apparatus further includes an RF processing network operative to perform weighting and combining operations in the RF domain using the first plurality of RF signals, thereby producing a second plurality of RF signals capable of being transmitted by an antenna structure.

BRIEF DESCRIPTION OF THE DRAWINGS

For a better understanding of the nature of the features of the invention, reference should be made to the following detailed description taken in conjunction with the accompanying drawings, in which:

FIG. 2 shows a block diagram of a MIMO communication system having a transmitter and a receiver configured in accordance with the invention.

DETAILED DESCRIPTION OF THE INVENTION

Background and Overview of System Architecture

Figure 1A:
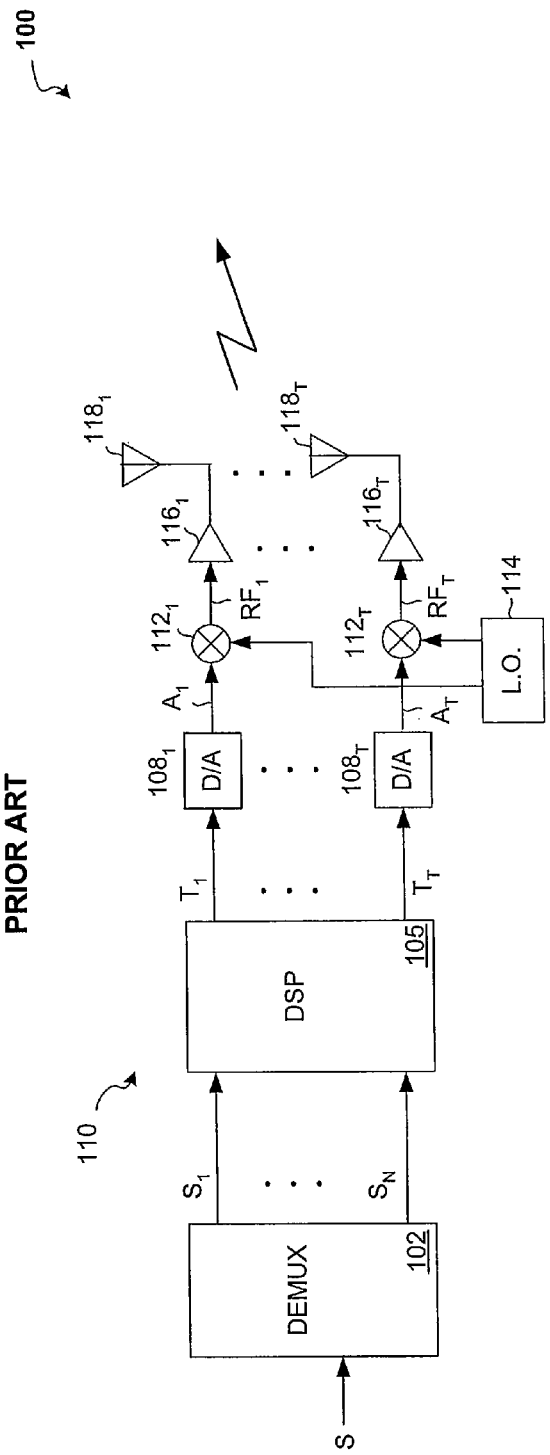
FIG. 1 illustratively represents a conventional MIMO communication system.

As is discussed below, the techniques of the invention may be employed in a wireless communication system in order to permit a smaller number of RF chains to be used within a transmitter and/or receiver than the number of transmit/receiver antennas utilized. In an exemplary implementation the inventive techniques are utilized within a spatially-multiplexed MIMO communication arrangement in which a number (N) of RF chains are used in support of N-fold spatial multiplexing. In this case the signal provided by each of M (M>N) antennas of a receiver is passed through a low noise amplifier and then split, weighted and combined in the RF domain with the signals from the other antennas of the receiver. This forms N RF output signals, which are then passed through N RF chains. In this exemplary implementation each RF chain includes a filter, downconverter, and A/D converter. The output signals produced by the A/D converter of each RF chain are then digitally processed to generate the N spatially-multiplexed output signals. By performing the requisite weighting and combining at RF using relatively inexpensive components, an N-fold spatially-multiplexed system having more than N receive antennas, but only N RF chains, can be realized at a cost similar to that of a system having N receive antennas. That is, receiver performance may be improved through use of additional antennas at relatively low cost.

A similar technique can be used at a transmitter incorporating N RF chains and more than N transmit antennas. Specifically, in the exemplary embodiment the N RF chains are followed by RF splitters, weighting elements and combiners collectively operative to generate signals for each of the more than N transmit antennas. As at the receiver, by performing such weighting and combining in the RF domain using relatively inexpensive components, an N-fold spatially-multiplexed system having more than N transmit antennas, but only N RF chains, can be realized at a cost similar to that of a system having N transmit antennas. That is, transmitter performance may be improved through use of additional antennas at relatively low cost.

The reduced-complexity antenna arrangement and receiver disclosed herein are configured to perform, within the RF domain, some or all of the weighting and combining operations necessary for spatially-multiplexed communication. These operations may be performed using a plurality of RF chains within each transmitter/receiver that are fewer in number than the number of transmit/receive antennas deployed.

Spatial Multiplexing

As is known, spatial multiplexing (SM) provides a mode of signal transmission predicated upon the use of multiple antennas at both a transmitter and a receiver in such a way that the bit rate of a wireless radio link may be increased without correspondingly increasing power or bandwidth consumption. In the case in which N antennas are used at both a transmitter and a receiver, an input stream of information symbols provided to the transmitter is divided into N independent substreams. Spatial multiplexing contemplates that each of these substreams will occupy the same "channel" (e.g., time slot, frequency, or code/key sequence) of the applicable multiple-access protocol. Within the transmitter, each substream is separately applied to the N transmit antennas and propagated over an intervening multipath communication channel to a receiver. The composite multipath signals are then received by a receive array of N receive antennas deployed at the receiver. At the receiver, a "spatial signature" defined by the N phases and N amplitudes arising at the receive antenna array for a given substream is then estimated. Signal processing techniques are then applied in order to separate the received signals, which permits the original substreams to be recovered and synthesized into the original input symbol stream. The principles of spatially-multiplexed communication and exemplary system implementations are further described in, for example, "Optimum combining for indoor radio systems with multiple users", by J. H. Winters, IEEE Transactions on Communications, Vol. COM-35, No. 11, November 1987, which is hereby incorporated by reference in its entirety.

Conventional MIMO System

Figure 1B:
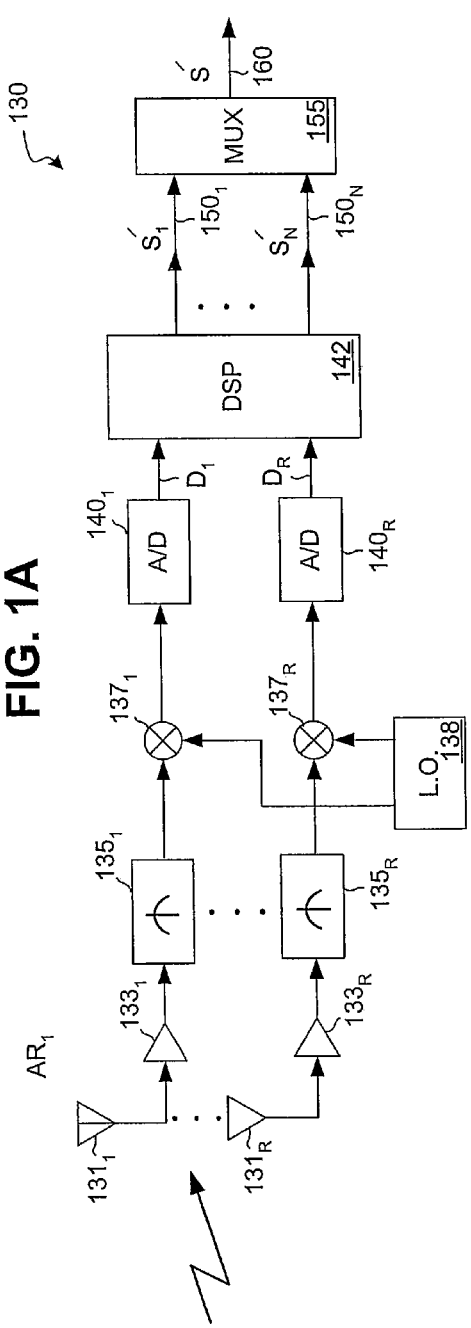

The principles of the present invention may be more fully elucidated by first considering a conventional MIMO communication system, which is illustratively represented by FIG. 1. As shown, the MIMO system 100 of FIG. 1 includes a transmitter 110 depicted in FIG. 1A and a receiver 130 depicted in FIG. 1B. The transmitter 110 and receiver 130 include a set of T transmit RF chains and a set of R receive RF chains, respectively, which are configured to transmit and receive a group of N spatially-multiplexed signals. Within the system 100 it is assumed that either (i) T is greater than N and R is equal to N, (ii) T is equal to N and R is greater than N, or (iii) both T and R are greater than N.

Referring to FIG. 1A, an input signal S to be transmitted, which typically consists of a stream of digital symbols, is demultiplexed by demultiplexer 102 into N independent substreams $S_{1, 2, \ldots, N}$. The substreams $S_{1, 2, \ldots, N}$ are then sent to digital signal processor (DSP) 105, which generates a set of T output signals $T_{1, 2, \ldots, T}$. The T output signals $T_{1, 2, \ldots, T}$ are typically generated from the N substreams $S_{1, 2, \ldots, N}$ by weighting, i.e., multiplying by a complex number, each of the N substreams $S_{1, 2, \ldots, N}$ by T different weighting coefficients to form NT substreams. These NT substreams are then combined in order to form the T output signals $T_{1, 2, \ldots, T}$. The T output signals $T_{1, 2, \ldots, T}$ are then converted to T analog signals $A_{1, 2, \ldots, T}$ using a set of T digital-to-analog (D/A) converters 108. Each of the T analog signals $A_{1, 2, \ldots, T}$ is then upconverted to the applicable transmit carrier RF frequency within a mixer 112 by mixing with a signal provided by a local oscillator 114. The resulting set of T RF signals (i.e., $RF_{1, 2, \ldots, T}$) are then amplified by respective amplifiers 116 and transmitted by respective antennas 118.

Referring now to FIG. 1B, the RF signals transmitted by the transmitter 110 are received by a set of R receive antennas 131 deployed at the receiver 130. Each of the R signals received by an antenna 131 is amplified by a respective low noise amplifier 133 and passed through a filter 135. The resultant filtered signals are then each down-converted from RF to baseband using mixers 137, each of which is provided with a signal from local oscillator 138. Although the receiver of FIG. 1B is configured as a homodyne receiver, a heterodyne receiver characterized by an intermediate IF frequency could also be used. The respective R baseband signals produced by the mixers 137 are then converted to digital signals using a corresponding set of R analog-to-digital (A/D) converters 140. The resulting R digital signals $D_{1, 2, \ldots, R}$ are then weighted and combined using digital signal processor 142 to form N spatially-multiplexed output signals $S'_{1, 2, \ldots, N}$, which comprise estimates of the transmitted signals $S_{1, 2, \ldots, N}$. The N output signals $S'_{1, 2, \ldots, N}$ are then multiplexed using a multiplexer 155 in order to generate an estimate 160 (S') of the original input signal S.

RF Weighting and Combining in Spatially-Multiplexed Communication Systems

Turning now to FIG. 2, there is shown a block diagram of a MIMO communication system 200 having a transmitter 210 and receiver 250 configured in accordance with the invention. In the embodiment of FIG. 2 the transmitter 210 and receiver 250 effect N-fold spatial multiplexing using only N transmit/receive RF chains, even though more than N transmit/receive antennas are respectively deployed at the transmitter 210 and receiver 250. Specifically, the transmitter 210 includes a set of MT transmit antennas 240 and the receiver includes a set of MR receive antennas 260, it being assumed that either (i) MT is greater than N and MR is equal to N, (ii) MT is equal to N and MR is greater than N, or (iii) both MT and MR are greater than N.

As shown in FIG. 2A, an input signal S to be transmitted is demultiplexed by demultiplexer 202 into N independent substreams $SS_{1, 2, \ldots, N}$. The substreams $SS_{1, 2, \ldots, N}$ are then converted to N analog substreams $AS_{1, 2, \ldots, N}$ using a corresponding set of D/A converters 206. Next, the N analog substreams $AS_{1, 2, \ldots, N}$ are upconverted to the applicable transmit carrier RF frequency using a set of mixers 212 provided with the signal produced by a local oscillator 214. The resultant N RF signals (i.e., $RF_{1, 2, \ldots, N}$) are then each split MT ways by dividers 218 in order to form N·(MT) RF signals. These N·(MT) RF signals are each weighted using complex multipliers $226_{x,y}$, where x identifies a signal origination point at one of the N dividers 218 and y identifies a corresponding signal termination point at one of a set of MT combiners 230. The weighted RF signals are combined using the combiners 230, thereby yielding a set of MT output signals. A corresponding set of MT amplifiers 234 then amplify these MT output signals, with the amplified output signals then being transmitted using the MT antennas 240. The weighting values of the complex multipliers $226_{x,y}$ may be generated so as to maximize the SNR of the output signal at the receiver.

Referring to FIG. 2B, the MT RF signals transmitted by the transmitter 210 are received by the set of MR receive antennas 260 deployed at the receiver 250. Each of the MR received signals is amplified by a respective low noise amplifier 264 and then split N ways by one of a set of MR dividers 268. The resulting MR·(N) split signals are then each weighted by respective weighting circuits $272_{x,y}$, where x identifies a signal origination point at one of the MR dividers 268 and y identifies a corresponding signal termination point at one of a set of N combiners 276. These weighted signals are then combined using the N combiners 276 in order to form a set of N signals, which are passed through a corresponding set of N filters 280. The resulting N filtered signals are then downconverted to baseband using a set of N mixers 282, each of which is provided with a carrier signal produced by a local oscillator 284. Although the receiver 250 is realized as a homodyne receiver in the embodiment of FIG. 2B, it could also be implemented as a heterodyne receiver characterized by an intermediate IF frequency. The N baseband signals produced by the mixers 282 are then converted to digital signals via a corresponding set of N A/D converters 286. The N digital signals are then further processed using digital signal processor 288 to form the N spatially-multiplexed output signals $SS'_{1, 2, \ldots, N}$, which are the estimates of the N independent substreams $SS_{1, 2, \ldots, N}$. The N output signals $SS'_{1, 2, \ldots, N}$ are then multiplexed via a multiplexer 292 in order to generate the output signal S', which is an estimate of the input signal S.

It is observed that the transmitter 210 and receiver 250 are capable of implementing, within the RF domain, the same spatial weighting or linear combining schemes as are conventionally implemented at baseband via the system 100 of FIG. 1. However, the DSP 288 within the inventive receiver 250 may still perform many other baseband signal processing operations potentially effected within the system 100, such as, for example, successive interference cancellation (see, e.g., "V-BLAST: An architecture for realizing very high data rates over the rich-scattering wireless channel", *Proceedings of URSI ISSSE*, September 1998, pp. 295-300). Again, it is a feature of the disclosed system that only N transmit/receive RF chains need be employed, even when substantially more than N transmit/receive antennas are deployed.

The teachings of the present invention are applicable to, for example, (i) receivers using multiple antennas in what are referred to herein as single channel systems (i.e., systems lacking spatial multiplexing), (ii) transmitters using multiple antennas in single channel systems, and (iii) systems in which a smaller number of RF chains are used at the transmitter and/or receiver than the number of transmit/receiver antennas in a MIMO system with spatial multiplexing.

Although the techniques described herein may be utilized in the development of RF-based weighting and combining schemes implemented using low-cost RF components, the teachings of the present invention are equally applicable to implementations containing both RF-based and baseband weighting and combining arrangements. Accordingly, both RF-based and baseband weighting and combining schemes are described hereinafter. In this regard various embodiments of the invention include only RF weighting and combining schemes while others contemplate use of both RF and baseband weighting and combining schemes. In general, it is expected that weighting and combining consistent with the description herein may be more economically performed in the RF domain than at baseband, but that implementations including both RF-based and baseband combining arrangements may in certain cases offer superior performance results.

Weight Generation Method for RF Weighting and Combining Based on Maximum Output Signal-to-Noise Ratio In the exemplary multi-antenna embodiments of the present invention, the weighting values or "weights" used during the RF-based weighting and combining process of the present invention are selected so as to maximize the output signal-to-noise ratio of the applicable multi-antenna system. In general, the embodiments described below are configured such that the signals received by multiple antennas are weighted and combined at RF using a single frequency-independent weight for each antenna. A single frequency-independent weight is defined such that the weight coefficients are constant over a given channel domain, including the frequency bandwidth, the tap delay profile, the time impulse response, and the Rake fingers profile. The weight generation method described below enables calculation of the weights that maximize the output signal-to-noise ratio, as averaged over the channel. Furthermore, the method can also be used for weight generation at the transmitter when multiple antennas are used for transmission, with the transmitted signal split and weighted at RF using a single frequency-independent weight for each transmit antenna. Although weight generation based upon maximization of output signal-to-noise is described in the context of the exemplary embodiments disclosed herein, the RF-based weighting and combining techniques of the present invention are not limited to any particular criteria in connection with selection of element weighting values.

As is described in further detail below, the weights selected for use in the exemplary embodiments described herein are obtained from the eigenvector corresponding to the largest eigenvalue of the average channel cross-correlation matrix. Again, the average is taken over a given channel domain, including the frequency bandwidth, the tap delay profile, the time impulse response, or the Rake fingers profile. In the case of a multi-antenna receiver in a single channel system where the OFDM modulation is employed, the weights are given by the eigenvector corresponding to the largest eigenvalue of the channel cross-correlation matrix averaged over the bandwidth of the signal. For the multi-antenna transmitter in a single channel system, the weights are given by the eigenvector corresponding to the largest eigenvalue of the cross-correlation matrix of the transpose conjugate of the channel averaged over the bandwidth of the signal.

A slightly different approach is taken in cases involving a multi-antenna transmitter and a multi-antenna receiver in a single channel system. Specifically, in this case the weights for the transmitter are given by the eigenvector corresponding to the largest eigenvalue of the cross-correlation matrix of the product of (i) the transpose conjugate of the channel, and (ii) the receiver weights, where the product is averaged over the bandwidth of the signal. The weights for the receiver are given by eigenvector corresponding to the largest eigenvalue of the cross-correlation matrix of the product of (i) the channel, and (ii) the transmitter weights, where the product is averaged over the bandwidth of the signal. This approach is also used to determine the weights for each signal at a receiver disposed within a MIMO system utilizing spatial multiplexing. In this case each such weight is a function of the channel propagation matrix and channel cross-correlation matrix corresponding to the signal of interest.

In the case of a multi-antenna receiver in a single channel system utilizing direct sequence spread spectrum modulation, the weights are given by the eigenvector corresponding to the largest eigenvalue of the channel cross-correlation matrix averaged over the multiple tap delays or the Rake finger profile of the signal.

Exemplary Scenarios

The RF weighting and combining methods employed consistent with the present invention will be described hereinafter with reference to the exemplary scenarios illustratively represented by FIGS. 3-10. Specifically, the methods will be explained within the context of the following four scenarios: 1) a receiver using multiple antennas in a single channel SIMO system without spatial multiplexing, 2) a transmitter using multiple antennas in a single channel multiple-input single output (MISO) system without spatial multiplexing, 3) a transmitter using multiple antennas and a receiver using multiple antennas in a single channel MIMO system without spatial multiplexing, and 4) a system whereby a smaller number of RF chains are used at the transmitter and/or receiver than the number of transmitter/receiver antennas in a MIMO system with spatial multiplexing. Again, embodiments of the invention implemented with exclusively RF-based weighting and combining arrangements, as well as with both RF-based and baseband arrangements, are described for each of the preceding cases.

For illustrative purposes, many of the following examples are described with reference to systems utilizing OFDM modulation; however, the application of the invention to an exemplary system based upon a direct sequence spread spectrum (DS-SS) has also been described. The DS-SS receiver can be extended to include the spatial domain in the form of a space-time Rake receiver, which is operative to combine the multi-path taps in the temporal and spatial domains. This extension illustrates that the techniques described herein may be generalized to virtually any system employing temporal/frequency domain processing in a frequency-selective fading environment.

Figure 3:
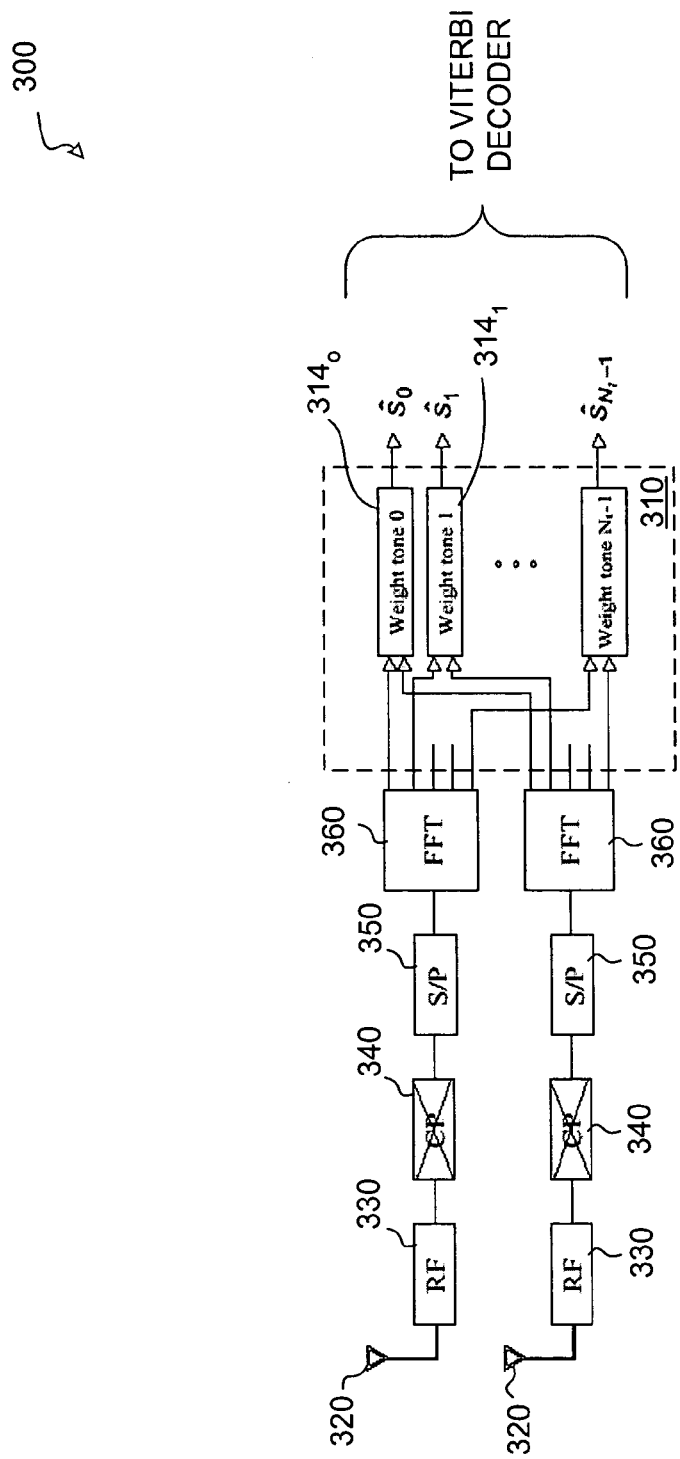
FIG. 3 depicts a receiver structure in a single-channel (SC) single-input-multiple-output (SIMO)-OFDM system in the case in which a baseband combining arrangement is used.

FIG. 3 depicts a receiver structure 300 in a SC-SIMO system in the case in which a baseband combining arrangement 310 is used. Consistent with the invention, such a baseband combining arrangement may be incorporated within a SC-SIMO receiver structure which also contains an RF-based weighting and combining arrangement (see, e.g., FIG. 4 and the accompanying discussion). In this way a portion of the requisite weighting and combining is performed within the RF domain and the balance at baseband.

In the receiver structure of FIG. 3, the values of the baseband weighting elements 314 are computed over both space and frequency. Note that the system follows the 802.11a standard requirements, i.e. the transmitter uses the OFDM modulation, where a stream of $N_t$ consecutive quadrature amplitude modulation (QAM)-modulated data symbols, denoted by $\{s_o, s_1, \ldots, s_{N_t-1}\}$ is modulated onto a set of $N_t$ orthogonal subcarriers, see, e.g., J. Heiskala and J. Terry, OFDM Wireless LANs: A Theoretical and Practical Guide, Sams Publishing, December 2001. At the receiver 300, the signal received at each antenna element 320 is demodulated and down-converted from RF to baseband within RF chain 330. Then the cyclic prefix (CP), which was added at the transmitter to mitigate inter-symbol interference (ISI), is removed 340. The symbols, via a serial-to-parallel conversion 350, are then mapped to the subcarriers of a 64-point fast Fourier transform (FFT) 360.

In a noise-limited scenario, the reconstructed data signal at the output of the FFT 3360 of the $i^{th}$ receive antenna element 320 for the k-th tone is given by $$r_{i,k} = H_i(e^{j\frac{2\pi}{N_t}k}) \cdot s_k + n_{i,k} \quad (1.)$$

where H is the channel frequency response of the L-tap channel impulse response denoted by $\{h_o, h_1, \ldots, h_{L-1}\}$ and n is complex-valued additive white Gaussian noise (AWGN) with zero-mean and variance $\sigma^2$. The relationship between frequency-domain H and time-domain h is:

$$H(e^{j\frac{2\pi}{N_t}k}) = \sum_{l=0}^{L-1} h_l e^{-j\frac{2\pi}{N_t}lk} \quad (2.)$$

The received signals from each antenna element 320 are collected in a M-dimensional vector, where M is the number of receive antenna elements. The received vector at tone k becomes:

$$\underline{r}_k = \underline{H}_k \cdot s_k + \underline{n}_k \quad (3.)$$

where $\underline{r}_k = [r_{1,k}, r_{2,k}, \ldots r_{M,k}]^T$, $$\underline{H}_k = \left[H_1(e^{j\frac{2\pi}{N_t}k}), H_2(e^{j\frac{2\pi}{N_t}k}), \ldots, H_M(e^{j\frac{2\pi}{N_t}k})\right]^T$$

and $\underline{n}_k = [n_{1,k}, n_{2,k}, \ldots n_{M,k}]^T$ are all M-dimensional vectors.

The received vector is multiplied at each tone by an M-dimensional weight vector $\underline{w}_k$. The resulting output signal at tone k is given by $$y_k = \underline{w}_k^H \cdot \underline{r}_k = \underline{w}_k^H \underline{H}_k \cdot s_k + \underline{w}_k^H \underline{n}_k \quad (4.)$$

The corresponding output signal-to-noise ratio (SNR) at tone k is $$SNR_k = \frac{\sigma_s^2}{\sigma^2} \frac{\underline{w}_k^H \underline{H}_k \underline{H}_k^H \underline{w}_k}{\underline{w}_k^H \underline{w}_k} \quad (5.)$$

where $\sigma_s^2 = E[s_k s_k^*]$ and $\sigma^2 = E[n_k n_k^*]$ are considered constant over the frequency domain.

In a noise-limited scenario, the weight maximizing the output SNR at tone k is:

$$\underline{w}_k = \underline{H}_k / \|\underline{H}_k\|^2 \qquad (6.)$$

The corresponding output signal $y_k$ becomes $$y_k = \hat{s}_k = s_k + \frac{H_k^H}{\|H_k\|^2} n_k$$

where $y_k$ corresponds to the estimate of the data symbol transmitted on tone k.

The corresponding maximum output SNR is then $$SNR_{max,k} = \frac{\sigma_s^2}{\sigma^2} \|\underline{H}_k\|^2 = \frac{\sigma_s^2}{\sigma^2} \sum_{i=1}^{M} \left| H_i(e^{j\frac{2\pi}{N_t} k}) \right|^2 \qquad (7.)$$

This corresponds to the Maximum Ratio Combining (MRC) solution, where the output SNR at tone k is the sum of the individual SNR received at each antenna element at tone k.

It is observed that the use of linear combining weights can lead to channel noise enhancement. Whenever a convolutional encoder is used at the transmitter, the information about the output noise on each individual sub-carrier should be incorporated into the Viterbi algorithm used at the receiver to provide significant performance improvement in fading channels, as shown in J. Heiskala and J. Terry, OFDM Wireless LANs: A Theoretical and Practical Guide, Sams Publishing, December 2001. Specifically, each "soft" bit entering the Viterbi decoder is weighted by a factor that is inversely proportional to the "enhanced" noise, such noise being a function of the sub-carrier channel on which the soft bit was transmitted. This adjustment allows the convolutional decoder to apply different weights to the information it receives from different tones. In this way the contribution of the information from tones experiencing poor channel conditions may be diminished by the weighting, while the contribution of information from tones experiencing favorable channel conditions may be augmented. Such variable weighting is expected to result in improved performance under frequency-varying conditions.

The computation of the metric weighting used in Viterbi decoding proceeds as follows:

The error signal at tone k is expressed as:

$$e(k) = s_k - \underline{w}_k^H \cdot \underline{r}_k = s_k(1 - \underline{w}_k^H \cdot \underline{H}_k) - \underline{w}_k^H \cdot \underline{n}_k \qquad (8.)$$

The mean squared error (MSE)—or post-combining noise variance—is thus $$\Sigma_H = E|e(k)|^2 = E|s_k|^2(1 - \underline{w}_k^H \cdot \underline{H}_k)(1 - \underline{H}_k^H \cdot \underline{w}_k) + \sigma^2 \underline{w}_k^H \underline{w}_k \qquad (9.)$$

$$\Sigma_H = \sigma_s^2 (1 - \underline{H}_k^H \cdot \underline{w}_k - \underline{w}_k^H \cdot H_k + \underline{w}_k^H \cdot \underline{w}_k) + \sigma^2 \underline{w}_k^H \underline{w}_k \qquad (10.)$$

With $\underline{w}_k = \underline{H}_k / \|\underline{H}_k\|^2$ from (6), then $\Sigma_H = \sigma^2 / \|\underline{H}_k\|^2$.

Since $\sigma^2$ is assumed to be constant over the frequency bandwidth, it can be ignored without affecting the performance of the Viterbi decoder. The metrics weighting (MW), denoted by MW(k), are then $$\Sigma'_H = 1/\|\underline{H}_k\|^2; \quad MW(k) = 1/\Sigma'_H = \|\underline{H}_k\|^2 \qquad (11.)$$

Each bit composing the symbol $s_k$ is weighted by MW(k).

In summary, the present case contemplates that a different weight be computed at each tone based on the knowledge of the channel frequency response at the tone so as to maximize the output SNR at the tone. Unfortunately, straightforward implementation of this approach results in incurring the expense of dedicating one RF chain to each receive antenna.

The next case considered is one in which the spatial received signals are combined in the RF domain such that only a single RF chain need be used. This approach advantageously minimizes costs within the applicable user equipment. As is discussed below, the weighting element values are derived consistent with this approach by maximizing the average output signal-to-noise ratio over the signal bandwidth of interest.

Figure 4:
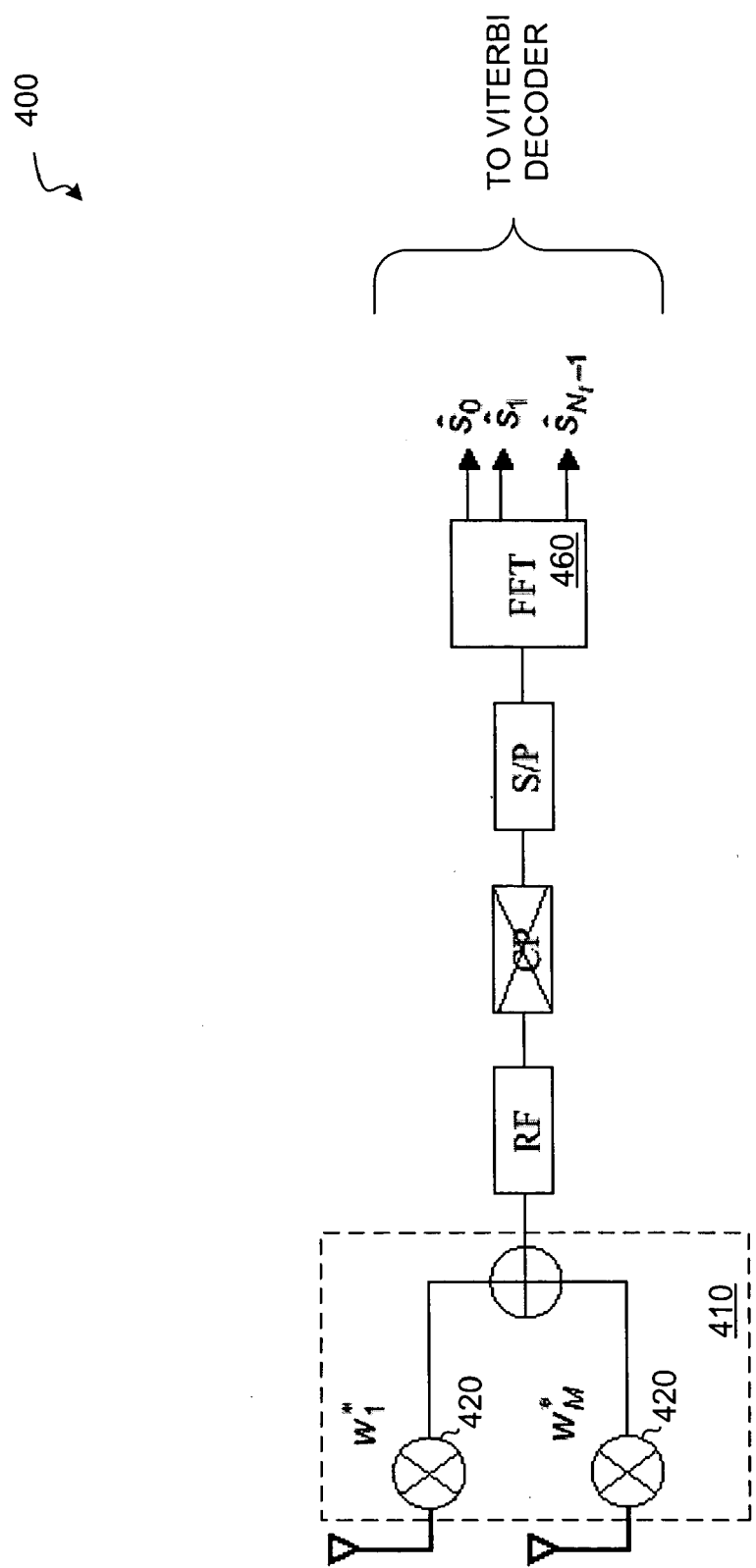
FIG. 4 depicts the receiver structure in a SC-SIMO-OFDM system in the case in which an RF-based weighting and combining network is employed.

FIG. 4 depicts receiver structure 400 in a SC-SIMO system in the case in which an RF-based weighting and combining network 410 is employed. In this case the weights 420 may be defined by a one-dimensional vector that is common to all tones. The computation of the weights 420 may be carried out in baseband, in which case the values of the weights 420 are fed back to the RF domain via an internal bus.

As mentioned previously, in alternate implementations the RF-based weighting and combining arrangement within the receiver structure 400 may be complemented by a baseband weighting and combining arrangement. This results in a portion of the requisite weighting and combining being performed in the RF domain and the balance being effected at baseband.

In configuration depicted in FIG. 4, the output of the FFT 460 at tone k is given by $$y_k = \underline{w}^H \cdot \underline{r}_k = \underline{w}^H \underline{H}_k \cdot s_k + \underline{w}^H \underline{n}_k \qquad (12.)$$

where $\underline{w}$ is an M-dimensional vector which no longer depends on the subscript k.

Based on (12), the output SNR at tone k is $$SNR_k = \frac{\sigma_s^2}{\sigma^2} \frac{w^H H_k H_k^H w}{w^H w} \qquad (13.)$$

The sum of the individual SNRs across all tones is then $$\overline{SNR} = \sum_{k=0}^{N_t-1} SNR_k = \frac{\sigma_s^2}{\sigma^2} \frac{w^H \sum_{k=0}^{N_t-1} H_k H_k^H w}{w^H w} = \frac{\sigma_s^2}{\sigma^2} \frac{w^H HH^H w}{w^H w} \qquad (14.)$$

where $H = [\underline{H}_0, \ldots, \underline{H}_{N_t-1}]$. It is desired to find the weight vector $\underline{w}$ that maximizes the average output SNR (where the average is taken over the frequency tones). The problem reduces to $$\arg\max_{\underline{w}} \frac{w^H HH^H w}{w^H w} = \lambda_{max} \qquad (15.)$$

Equation (15) is an eigenvalue problem (see S. Haykin, Adaptive Filter Theory, 3$^{rd}$ Ed., Prentice Hall, 1996), and $\underline{w}$ is the eigenvector corresponding to the largest eigenvalue $\lambda_{max}$ of $HH^H$.

The solution is formulated as:

$$\underline{w} = eig(\lambda_{max}, HH^H) \qquad (16.)$$

As a last step, the output signal $y_k$ is multiplied by a scalar such that the FFT output signal is expressed as a function of $s_k$ plus a noise residual component. Recall that the output of the FFT 460 at tone k is given by $$y_k = \underline{w}^H \cdot \underline{r}_k = \underline{w}^H \underline{H}_k \cdot s_k + \underline{w}^H \underline{n}_k \qquad (17.)$$

Assume that $$\underline{w}^H \underline{H}_k = \alpha_k \qquad (18.)$$

Then, the output signal $y_k$ is multiplied by a scalar $u_k$ such that $u_k^* \underline{w}^H \underline{H}_k = 1$. In this case, $u_k$ is given by $$u_k = \frac{\alpha_k}{|\alpha_k|^2} = \frac{\underline{w}^H \underline{H}_k}{\underline{w}^H \underline{H}_k \underline{H}_k^H \underline{w}} \qquad (19.)$$

The scaled FFT output, denoted by $z_k$, becomes $$z_k = \hat{s}_k = u_k^* y_k = s_k + u_k^* \underline{w}^H \underline{n}_k \qquad (20.)$$

Of course, the multiplication of $y_k$ by $u_k^*$ does not affect the output SNR at tone k (since it multiplies both signal and noise components). The output SNR at tone k is given by (13).

The computation of the metric weighting used in Viterbi decoding proceeds as follows:

The error signal at tone k is expressed as:

$$e(k) = s_k - u_k^* \underline{w}^H \underline{r}_k = s_k(1 - u_k^* \underline{w}^H \underline{H}_k) - u_k^* \underline{w}^H \underline{n}_k \qquad (21.)$$

The MSE—or post-combining noise variance—is thus $$\Sigma_H = E|e(k)|^2 = \sigma^2 |u_k|^2 \underline{w}^H \underline{w} \qquad (22.)$$

By using the expression of $u_k$ in (19), $\Sigma_H$ becomes $$\Sigma_H = \frac{\sigma^2 \underline{w}^H \underline{w}}{\underline{w}^H \underline{H}_k \underline{H}_k^H \underline{w}}$$

Since $\sigma^2$ is assumed to be constant over the frequency bandwidth, and $\underline{w}$ is also constant over frequency, the product $\sigma^2 \underline{w}^H \underline{w}$ can be ignored without affecting the performance of the Viterbi decoder. The metrics weighting (MW) denoted by MW(k) are then $$\Sigma'_H = \frac{1}{\underline{w}^H \underline{H}_k \underline{H}_k^H \underline{w}}; \quad MW(k) = 1/\Sigma'_H = \underline{w}^H \underline{H}_k \underline{H}_k^H \underline{w} \qquad (23.)$$

A derivation similar to that described above with reference to the case of a single-antenna transmitter and a multi-antenna receiver may be used to obtain the weights applicable to the case of a multi-antenna transmitter and a single-antenna receiver. The weight solutions are set forth below.

Weight Solution for Baseband Combining Arrangement

The weight solution at each tone is the eigenvector of the matrix $\underline{H}_k^H \underline{H}_k$ corresponding to the largest eigenvalue.

$$\underline{w}_k = \text{eig}(\lambda_{max}, \underline{H}_k^H \underline{H}_k) \qquad (24.)$$

where $\underline{H}_k$ is a row vector of size $1 \times n_T$ (with $n_T$ as the number of transmit antenna elements) which represents the channel frequency response at tone k.

Note that in order to keep the total transmit power P constant regardless of the number of transmit antennas, the norm of $\underline{w}_k$ is constrained such that:

$$\underline{w}_k^H \underline{w}_k = \|\underline{w}_k\|^2 = P/\sigma_s^2 \qquad (25.)$$

Weight Solution for RF Combining Arrangement

The single frequency-independent weight solution that maximizes the output SNR in a SC-MISO system is given by the eigenvector of the matrix $H^H H$ corresponding to the largest eigenvalue.

$$\underline{w} = \text{eig}(\lambda_{max}, H^H H) \qquad (26.)$$

where $H^H = [\underline{H}_0^H, \ldots, \underline{H}_{N_t-1}^H]$ is a $n_T \times N_t$ matrix.

In order to keep the total transmit power P constant regardless of the number of transmit antennas, the norm of $\underline{w}$ is constrained such that:

$$\underline{w}^H \underline{w} = \|\underline{w}\|^2 = P/\sigma_s^2 \qquad (27.)$$

Consistent with the invention, an RF-based weighting and combining arrangement may be implemented exclusively in the RF domain in accordance with the frequency-independent weight solution of (26) and (27), or may be supplemented by a baseband weighting and combining arrangement defined by (24) and (25).

Figure 5:
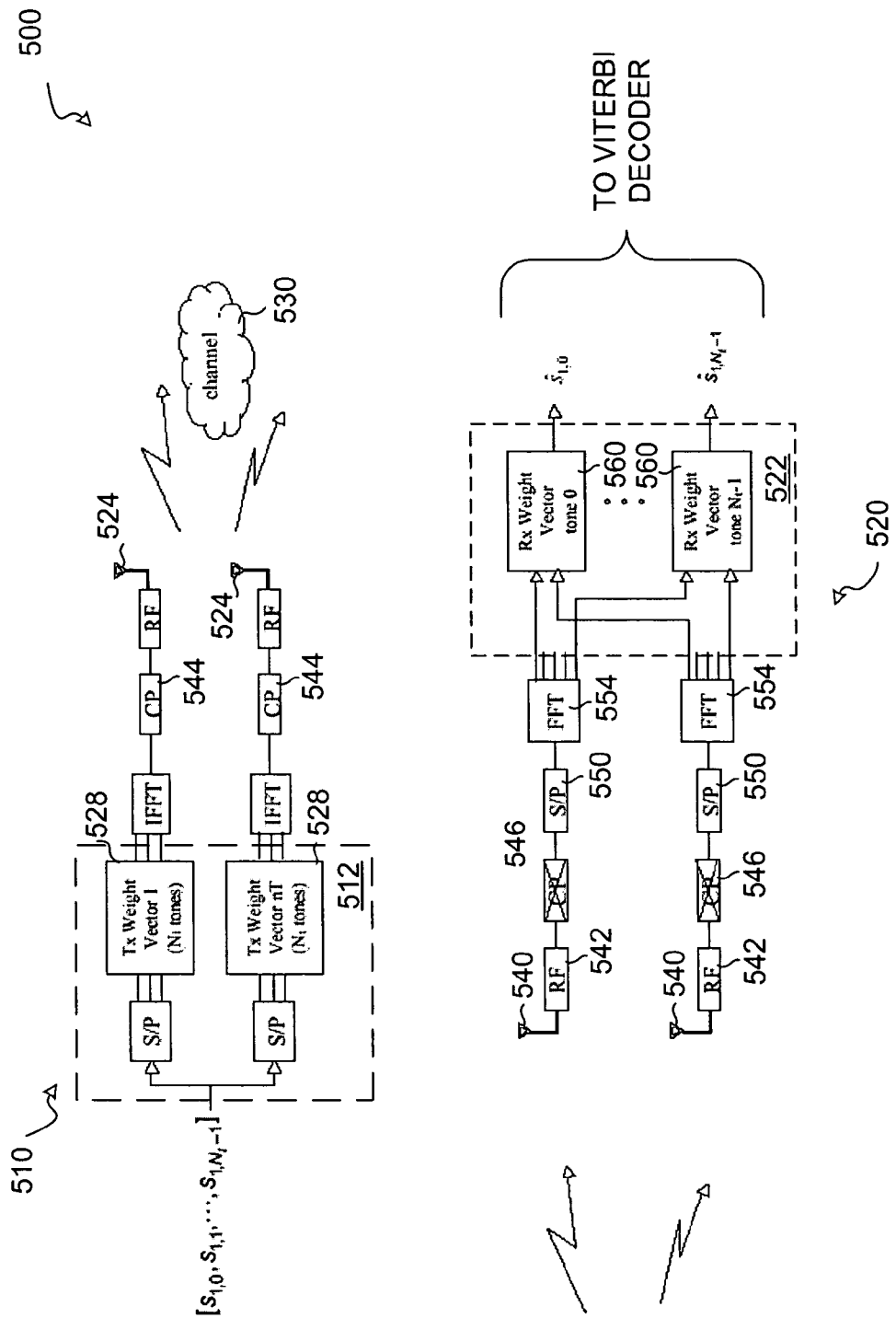
FIG. 5 depicts the transmitter and receiver structure of a SC-MIMO-OFDM system in the case in which a baseband combining arrangement is employed.

Turning now to FIG. 5, there is shown a transmitter 510 and a receiver 520 of a single channel (SC) MIMO-OFDM system 500 in the case in which a baseband combining arrangement is employed. Specifically, the transmitter 510 includes a Tx baseband combining arrangement 512 and the receiver 520 includes an Rx baseband combining arrangement 522. Consistent with the invention, such a baseband combining arrangement may be incorporated within SC MIMO-OFDM transmitter and receiver structures which also contain RF-based weighting and combining arrangements (see, e.g., FIG. 6 and the accompanying discussion). In this way a portion of the requisite weighting and combining is performed within the RF domain and the balance at baseband.

The transmitter 510 in FIG. 5 is composed of $n_T$ transmitting antenna elements 524, each of which conveys a weighted version of the same data sub-stream and uses the OFDM modulation. In other words, the stream of $N_t$ consecutive QAM-modulated data symbols denoted by $\{s_{1,0}, s_{1,1}, \ldots, s_{1,N_t-1}\}$ is weighted at each transmit antenna element 524 and modulated onto a set of $N_t$ orthogonal subcarriers. The transmit signal at tone k out of antenna j is $$txs_{j,k} = v_{j,k} \cdot s_{1,k} \qquad (28.)$$

The transmit vector at tone k is $$\underline{txs}_k = \underline{v}_k \cdot s_{1,k} \qquad (29.)$$

Therefore the transmit weights 528 can be viewed as a $n_T \times N_t$ matrix, which preferably is a function of the propagation channel 530. This, however, requires the transmitter 510 to be aware of the characteristics of the channel 530.

In order to keep the total transmit power P constant regardless of the number of transmit antenna elements 524, we assume that each of the digital symbols transmitted out of each transmitter antenna element 524 has a power $P/n_T$, i.e., $$E[s_{1,k} s_{1,k}^*] = P/n_T = \sigma_s^2 \qquad (30.)$$

The total transmit power based on (29) is $$TXPW = E[s_{1,k}^* \underline{v}_k^H \underline{v}_k s_{1,k}] = \underline{v}_k^H \underline{v}_k E[s_{1,k} s_{1,k}^*] = \underline{v}_k^H \underline{v}_k P/n_T \qquad (31.)$$

Since we want to constrain the total transmit power to P such that $$TXPW = P \qquad (32.)$$

then the constraint on the transmit weight is expressed as $$\text{trace}(\underline{v}_k \underline{v}_k^H) = \underline{v}_k^H \underline{v}_k = \|\underline{v}_k\|^2 = n_T \qquad (33.)$$

At the receiver 520, the signal received at each antenna element 540 is demodulated and down-converted from RF to baseband within RF chain 542. Then the cyclic prefix (CP), which was added 544 at the transmitter 510 to mitigate ISI, is removed 546. The symbols, via a serial-to-parallel conversion 550, are then mapped to the subcarriers of a 64-point FFT 554.

In a noise-limited scenario, the reconstructed data signal at the output of the FFT 554 of the $i^{th}$ receive antenna element 540 for the $k^{th}$ tone is given by $$r_{i,k} = s_{1,k} \sum_{j=1}^{n_T} H_{i,j}(e^{j\frac{2\pi}{N_t}k}) \cdot v_{j,k} + n_{i,k} \qquad (34.)$$

where $H_{i,j}$ is the channel frequency response of the L-tap channel impulse response denoted by $\{h_{i,j,0}, h_{i,j,1}, \ldots, h_{i,j,L-1}\}$ corresponding to transmit and receive antenna elements j and i respectively. n is complex-valued additive white Gaussian noise (AWGN) with zero-mean and variance $\sigma^2$. We collect the received signals from each antenna element in an M-dimensional vector. The received vector at tone k becomes:

$$\underline{r}_k = H_k \cdot \underline{v}_k \cdot s_{1,k} + \underline{n}_k \qquad (35.)$$

where $$H_k = \begin{bmatrix} H_{1,1}(e^{j\frac{2\pi}{N_t}k}), & \cdots, & H_{1,n_T}(e^{j\frac{2\pi}{N_t}k}) \\ & \vdots & \\ H_{M,1}(e^{j\frac{2\pi}{N_t}k}), & \cdots, & H_{M,n_T}(e^{j\frac{2\pi}{N_t}k}) \end{bmatrix} \text{ is a } M \times n_T \text{ matrix.}$$

The received vector is multiplied at each tone by the complex conjugate of a M×1 vector denoted by $\underline{u}_k$. The resulting output at tone k is given by $$y_k = \hat{s}_{1,k} = \underline{u}_k^H \cdot \underline{r}_k = \underline{u}_k^H H_k \cdot \underline{v}_k \cdot s_{1,k} + \underline{u}_k^H \underline{n}_k \qquad (36.)$$

where $y_k$ is the estimate of $s_{1,k}$.

The singular value decomposition (SVD) is an attractive technique for solving the joint optimization of the transmit and receive weights 528, 560, as shown in J. B. Andersen, "Antenna arrays in mobile communications: gain, diversity, and channel capacity," IEEE Ant. prop. Mag., 12-16, April 2000. An SVD expansion is a description of $H_k$ as given by $$H_k = U_k S_k V_k^H \qquad (37.)$$

where $S_k$ is a diagonal matrix of real, non-negative singular values, which are the square roots of the eigenvalues of $G_k = H_k^H H_k$. Thus we have, $$\underline{u}_k^H H_k \cdot \underline{v}_k = \sqrt{\lambda_{max,k}} \qquad (38.)$$

The solution for the transmitter and receiver weights 528, 560 are given directly from the right and left singular vectors of $H_k$ corresponding to the largest singular value. Note again that the transmit weights 528 are normalized according to (33) such that we have:

$$\underline{u}_k^H H_k \cdot \underline{v}_k = \sqrt{\lambda_{max,k}} \cdot \sqrt{n_T} \qquad (39.)$$

The corresponding maximum output SNR is then $$SNR_{max,k} = \frac{(\underline{u}_k^H H_k \cdot \underline{v}_k)^2 E[s_{1,k} s_{1,k}^*]}{\sigma^2 \|\underline{u}_k\|^2} \qquad (40.)$$

$$= \frac{\lambda_{max,k} n_T P / n_T}{\sigma^2}$$

$$SNR_{max,k} = \frac{P \lambda_{max,k}}{\sigma^2} \qquad (41.)$$

The computation of the metric weighting used in Viterbi decoding proceeds as follows:
The error signal at tone k is expressed as:

$$e(k) = s_{1,k} - y_k \qquad (42.)$$

Assuming that $\underline{u}_k$ may be normalized by $\sqrt{\lambda_{max,k}} \cdot \sqrt{n_T}$, we rewrite (36) as $$y_k = s_{1,k} + \frac{\underline{u}_k^H}{\sqrt{n_T \lambda_{max,k}}} \underline{n}_k \qquad (43.)$$

The MSE—or post-combining noise variance—is thus $$\Sigma_{H,k} = E|e(k)|^2 \qquad (44.)$$

$$= (s_{1,k} - y_k) \cdot (s_{1,k}^* - y_k^*)$$

$$\Sigma_{H,k} = \frac{\sigma^2 \underline{u}_k^H \underline{u}_k}{n_T \lambda_{max,k}} \qquad (45.)$$

$$= \frac{\sigma^2}{n_T \lambda_{max,k}}$$

where we used the fact that singular vectors have norm unity.

Since $\sigma^2/n_T$ is constant over the frequency bandwidth, it does not need to be taken into account in the metric. The metrics weighting (MW) are thus equal to $$MW(k) = \lambda_{max,k} \qquad (46.)$$

Each bit composing the symbol $y_k$ is weighted by MW(k).

In summary, the implementation of the present case involves computation, based on the knowledge of the channel frequency response at each tone, of a different transmit and receive weight at each tone such that the output SNR is maximized at the tone.

Next, a case is described with reference to FIG. 6 in which the spatial transmitted and received signals are combined in the RF domain. This permits use of an architecture containing only a single RF chain, which facilitates economical implementation of user equipment.

Figure 6:
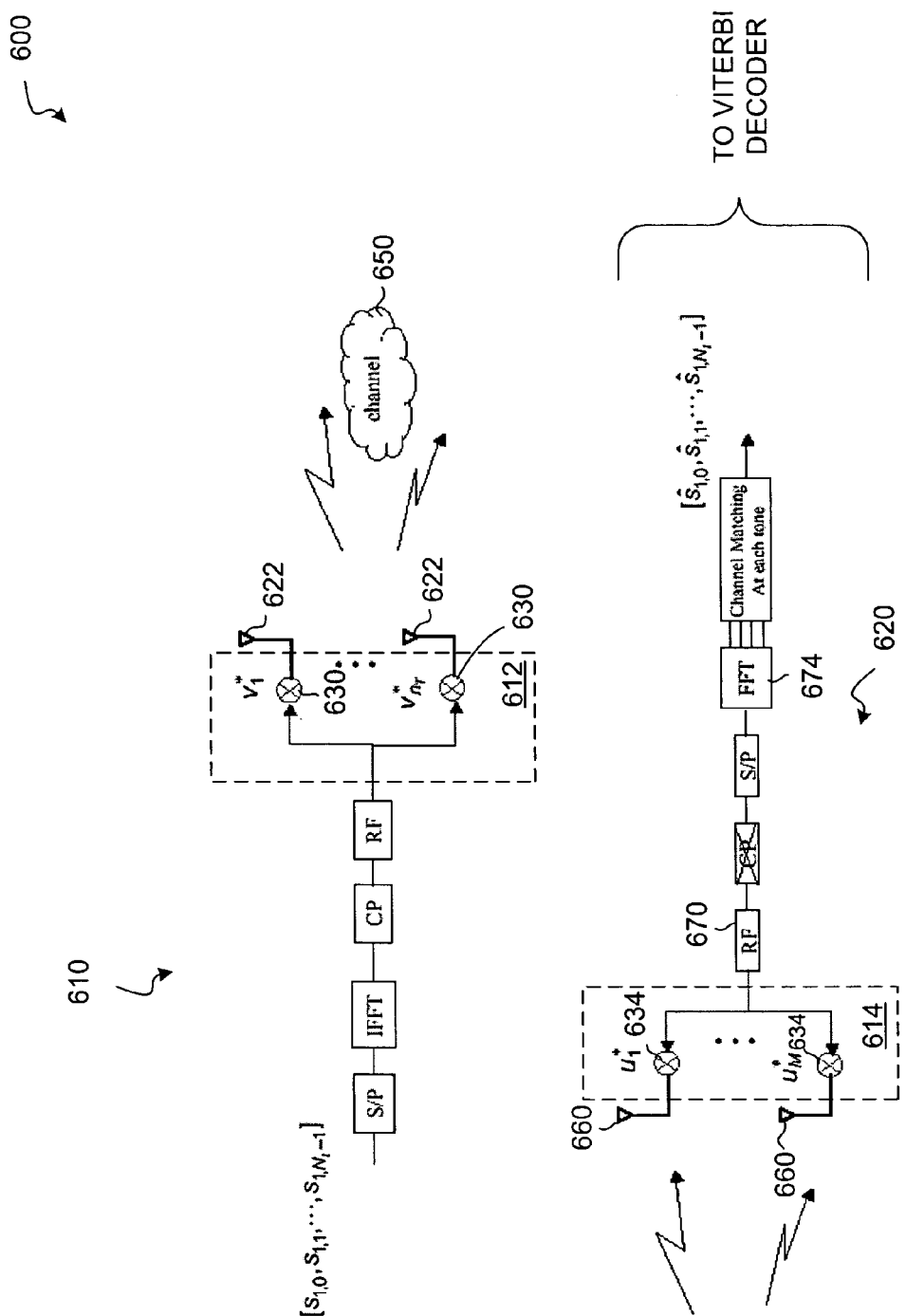
FIG. 6 illustratively represents the transmitter and receiver structure of a SC-MIMO-OFDM system utilizing an RF weighting and combining arrangement.

FIG. 6 illustratively represents a transmitter 610 and a receiver 620 of a SC-MIMO-OFDM system 600 utilizing RF weighting and combining arrangements 612 and 614, respectively. The transmitter 610 of the system 600 is composed of $n_T$ transmit antenna elements 622, each of which conveys a weighted version of the same data sub-stream and uses OFDM modulation. However, in contrast to the case of FIG. 5, the combining weights 630 in the present exemplary case are implemented using RF-based elements capable of being defined by a single vector. This advantageously permits the number of RF transmit chains to be reduced to one. At the receiver 620, the combining weights 634 are also implemented at RF as a single vector, and the combined received signal is then passed through a single RF chain for demodulation.

In alternate implementations the RF-based weighting and combining arrangements 612, 614 within the transmitter 610 and receiver 620 of FIG. 6 may be complemented by baseband weighting and combining arrangements. This results in a portion of the requisite weighting and combining being performed in the RF domain and the balance being effected at baseband.

In the configuration of FIG. 6, the transmit signal at tone k out of antenna j is $$txs_{j,k} = v_j \cdot s_{1,k} \quad (47.)$$

The transmit vector at tone k is $$\underline{txs}_k = \underline{v} \cdot s_{1,k} \quad (48.)$$

Therefore the transmit weights can be viewed as an $n_T \times 1$ vector, which preferably is a function of the propagation channel 650. However, it is no longer a function of the channel frequency selectivity, as it is common to all tones. The total transmit power is kept equal to P, so we have:

$$E[s_{1,k} s_{1,k}^*] = P/n_T = \sigma_s^2 \quad (49.)$$

Then the constraint on the transmit weight 630 is expressed as $$\mathrm{trace}(\underline{v}\underline{v}^H) = \underline{v}^H \underline{v} = \|\underline{v}\|^2 = n_T \quad (50.)$$

The signal propagates through the channel 650, and the received signals from each antenna element 660 of the receiver 620 are collected in an M-dimensional vector. The received vector at tone k becomes:

$$\underline{r}_k = H_k \cdot \underline{v} \cdot s_{1,k} + \underline{n}_k \quad (51.)$$

The received vector is multiplied at RF by an M×1 receive weight vector denoted by $\underline{u}$ and physically realized by weighting elements 634. It is then passed through an RF chain 670 for demodulation and downconversion. The combined received signal at the output of the FFT 674 can thus be written as:

$$y_k = \hat{s}_{1,k} = \underline{u}^H \cdot \underline{r}_k = \underline{u}^H H_k \underline{v} \cdot s_{1,k} + \underline{u}^H \underline{n}_k \quad (52.)$$

where $y_k$ is the estimate of $s_{1,k}$.

The corresponding output SNR at tone k is:

$$SNR_k = \frac{(\underline{u}^H H_k \cdot \underline{v})^2 E[s_{1,k} s_{1,k}^*]}{\sigma^2 \|\underline{u}\|^2}$$

$$= \frac{(\underline{u}^H H_k \cdot \underline{v})^2 P/n_T}{\sigma^2 \|\underline{u}\|^2} \quad (53.)$$

The mean SNR over frequency is expressed as $$\overline{SNR} = \frac{1}{N_t} \sum_{k=0}^{N_t-1} SNR_k \quad (54.)$$

$$= \frac{P/n_T}{N_t \sigma^2 \|\underline{u}\|^2} \sum_{k=0}^{N_t-1} (\underline{u}^H H_k \cdot \underline{v})^2$$

or equivalently $$\overline{SNR} = \frac{P/n_T}{N_t \sigma^2 \|\underline{u}\|^2} \sum_{k=0}^{N_t-1} \underline{u}^H H_k \underline{v}\underline{v}^H H_k^H \underline{u} \quad (55.)$$

For a given vector $\underline{v}$, we design $\underline{u}$ such that the following sum is maximized:

$$\frac{\underline{u}^H \left( \sum_{k=0}^{N_t-1} H_k \underline{v}\underline{v}^H H_k^H \right) \underline{u}}{\underline{u}^H \underline{u}} \quad (56.)$$

The solution for $\underline{u}$ that maximizes the quantity in (56) is the eigenvector of the matrix $$\left( \sum_{k=0}^{N_t-1} H_k \underline{v}\underline{v}^H H_k^H \right)$$

corresponding to the largest eigenvalue. We formulate the solution as:

$$\underline{u} = eig\left(\lambda_{\max}, \sum_{k=0}^{N-1} H_k \underline{v}\underline{v}^H H_k^H \right) \quad (57.)$$

For a given vector $\underline{u}$, we design $\underline{v}$ such that the following sum is maximized:

$$\frac{\underline{v}^H \left( \sum_{k=0}^{N_t-1} H_k^H \underline{u}\underline{u}^H H_k \right) \underline{v}}{\underline{v}^H \underline{v}} \quad (58.)$$

The solution for $\underline{v}$ that maximizes the quantity in (58) is the eigenvector of the matrix $$\left( \sum_{k=0}^{N_t-1} H_k^H \underline{u}\underline{u}^H H_k \right)$$

corresponding to the largest eigenvalue. We formulate the solution as:

$$\underline{v} = eig\left(\lambda_{\max}, \sum_{k=0}^{N_t-1} H_k^H \underline{u}\underline{u}^H H_k \right) \quad (59.)$$

The solution for $\underline{v}$ depends on $\underline{u}$ and vice-versa, and thus becomes a joint problem capable of being solved by, for example, a numerical search.

The computation of the metric weighting utilized in Viterbi decoding proceeds as follows:

The error signal at tone k is expressed as:

$$e(k) = s_{1,k} - y_k \quad (60.)$$

Assuming that $\underline{u}$ may be normalized at each tone by $(\underline{u}^H H_k \cdot \underline{v})^*$, we rewrite (52) as $$y_k = s_{1,k} + \frac{\underline{u}^H}{\underline{u}^H H_k \cdot \underline{v}} \underline{n}_k \quad (61.)$$

The MSE—or post-combining noise variance—is thus $$\Sigma_{H,k} = E|e(k)|^2 \quad (62.)$$
$$= (s_{1,k} - y_k) \cdot (s_{1,k}^* - y_k^*)$$
$$\Sigma_{H,k} = \frac{\sigma^2 \underline{u}^H \underline{u}}{(\underline{u}^H H_k \cdot \underline{v})^2} \quad (63.)$$

Since $\sigma^2 \underline{u}^H \underline{u}$ is constant over the frequency bandwidth, it does not need to be taken into account in the metric. The metrics weighting (MW) are thus equal to $$MW(k) = (\underline{u}^H H_k \underline{v})^2 \quad (64.)$$

Each bit composing the symbol $y_k$ is weighted by MW(k).

Figure 7:
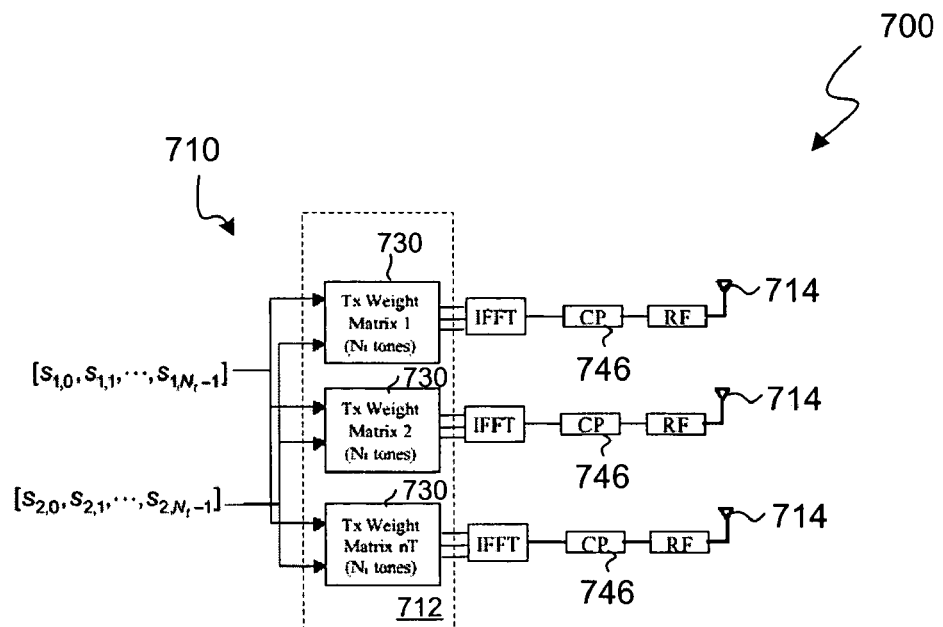
FIG. 7 depicts the transmitter and receiver structure of a spatially-multiplexed (SM)-MIMO-OFDM system incorporating baseband combining arrangements.
Figure 7:
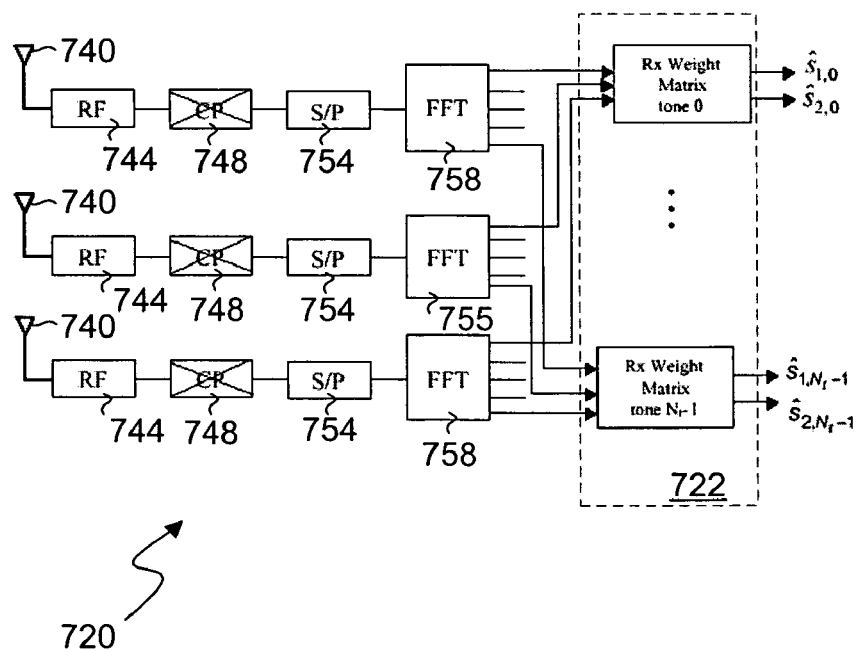

FIG. 7 depicts the transmitter 710 and receiver 720 of a spatially-multiplexed MIMO-OFDM system 700. As shown, the transmitter 710 and receiver respectively incorporate Tx and Rx baseband weighting and combining arrangements 712, 722. Consistent with the invention, these baseband weighting and combining arrangements may be incorporated within spatially-multiplexed MIMO-OFDM transmitter and receiver structures together with RF-based weighting and combining arrangements (see, e.g., FIG. 8 and the accompanying discussion). In this way a portion of the requisite weighting and combining is performed within the RF domain and the balance at baseband.

The transmitter 710 is composed of $n_T$ transmitting antenna elements 714, each of which conveys a weighted combination of N distinct sub-streams (i.e. spatially-multiplexed signals) and uses OFDM modulation, where a stream of $N_t$ consecutive QAM-modulated data symbols, denoted by $\{s_{i,o}, s_{i,1}, \ldots, s_{i,N_t-1}\}$, i=1, ..., N is modulated onto a set of $N_t$ orthogonal subcarriers.

In the system 700, the transmit signal at tone k out of the $j^{th}$ antenna element is $$txs_{j,k} = \sum_{i=1}^{N} v_{j,i,k} \cdot s_{i,k} \quad (65.)$$

The transmit vector at tone k is $$\underline{txs}_k = V_k \cdot \underline{s}_k \quad (66.)$$
$$= \sum_{i=1}^{N} \underline{v}_{i,k} \cdot s_{i,k}$$

where $V_k$ is the transmit weight matrix at tone k of size $n_T \times N$.

The total transmit power based on (66) is $$TXPW = \sum_{i=1}^{N} E[s_{i,k}^* \underline{v}_{i,k}^H \underline{v}_{i,k} s_{i,k}] \quad (67.)$$
$$= \sum_{i=1}^{N} \underline{v}_{i,k}^H \underline{v}_{i,k} E[s_{i,k} s_{i,k}^*]$$
$$= P/n_T \sum_{i=1}^{N} \underline{v}_{i,k}^H \underline{v}_{i,k}$$

where $E[s_{i,k} s_{i,k}^*] = P/n_T = \sigma_s^2$, i=1, ..., N $\quad$ (68.)

Since we want to constrain the total transmit power to P such that

TXPW=P $\quad$ (69.)

then the constraint on the transmit weight 730 is expressed as $$trace(V_k^H V_k) = \sum_{i=1}^{N} \underline{v}_{i,k}^H \underline{v}_{i,k} \quad (70.)$$
$$= n_T$$

To simplify the example, we present the case where the number ($n_T$) of transmit antenna elements 714 is equal to the number of spatially-multiplexed signals N. To simplify further, the weight matrix $V_k$ at each tone is made equal to the identity matrix. The transmit vector at tone k simplifies to:

$$\underline{txs}_k = \underline{s}_k \quad (71.)$$

It is to be understood that in other embodiments, $n_T$ can be made larger than N and/or the weight matrix $V_k$ can be a matrix other than the identity matrix. For example, when $V_k$ is dependent upon the channel, various "preceding" methods can assist in the computation of $V_k$ given a specific criterion to optimize.

At the receiver 720, the signal received at each antenna element 740 is demodulated and down-converted from RF to baseband within an RF chain 744. Then the cyclic prefix (CP), which was added 746 at the transmitter 710 to mitigate ISI, is removed 748. The symbols, via a serial-to-parallel conversion 754, are then mapped to the subcarriers of a 64-point FFT 758.

In a noise-limited scenario with $N=n_T=2$, the reconstructed data signal at the output of the FFT 758 of the $i^{th}$ receive antenna element 740 for the $k^{th}$ tone is given by $$r_{i,k} = H_{i,1}(e^{j\frac{2\pi}{N_t}k}) \cdot s_{1,k} + H_{i,2}(e^{j\frac{2\pi}{N_t}k}) \cdot s_{2,k} + n_{i,k} \quad (72.)$$

We collect the received signals from each antenna element 740 in an M-dimensional vector. The received vector at tone k becomes:

$$\underline{r}_k = H_k \underline{s}_k + \underline{n}_k \quad (73.)$$

In this case the received vector is multiplied at each tone by the complex conjugate of an M×N matrix denoted by $W_k$. The resulting output at tone k is given by $$\underline{y}_k = W_k^H \cdot \underline{r}_k = W_k^H H_k \underline{s}_k + W_k^H \underline{n}_k \quad (74.)$$

where $\underline{y}_k=[y_{1,k}, \ldots, y_{N,k}]^T$ is an N-dimensional vector is the estimate of $\underline{s}_k=[s_{1,k}, \ldots, s_{N,k}]^T$. The matrix $W_k$ can be expressed as $W_k=[\underline{w}_{k,1}, \ldots, \underline{w}_{k,N}]$.

The solution for $W_k$ is given by the well-known minimum mean squared error (MMSE) solution (i.e. Wiener-Hopf solution), see, e.g., S. Haykin, Adaptive Filter Theory, $3^{rd}$ Ed., Prentice Hall, 1996. The general solution is given by:

$$W_k = (H_k R_{s,k} H_k^H + R_{n,k})^{-1} H_k R_{s,k} \quad (75.)$$

where $R_{s,k}=E[\underline{s}_k \underline{s}_k^H]$ and $R_{n,k}=E[\underline{n}_k \underline{n}_k^H]$.

Assuming that $R_s=\sigma_s^2 I_N$ and $R_n=\sigma^2 I_M$, the solution simplifies to:

$$W_k = \left(H_k H_k^H + \frac{\sigma^2}{\sigma_s^2} I_M\right)^{-1} H_k \quad (76.)$$

or equivalently, $$W_k^H = \left(H_k^H H_k + \frac{\sigma^2}{\sigma_s^2} I_N\right)^{-1} H_k^H \quad (77.)$$

The computation of the metric weighting used in Viterbi decoding proceeds as follows:

The error signal j at tone k is expressed as:

$$e_j(k) = s_{j,k} - \underline{w}_{k,j}^H \cdot \underline{r}_k \quad (78.)$$

The MSE—or post-combining noise variance—is thus $$\Sigma_{H,j,k} = E|e_j(k)|^2 \quad (79.)$$

$$= (s_{j,k} - \underline{w}_{k,j}^H \cdot \underline{r}_k) \cdot (s_{j,k}^* - \underline{r}_k^H \underline{w}_{k,j})$$

$$\Sigma_{H,j,k} = \sigma_s^2 (1 - \underline{H}_{k,j}^H \cdot \underline{w}_{k,j} - \underline{w}_{k,j}^H \cdot \underline{H}_{k,j} + \underline{w}_{k,j}^H \cdot H_k H_k^H \cdot \underline{w}_{k,j}) + \sigma^2 \underline{w}_{k,j}^H \underline{w}_{k,j} \quad (80.)$$

where $\underline{H}_{k,j} = \begin{bmatrix} H_{1,j}(e^{j\frac{2\pi}{N_t}k}) \\ \vdots \\ H_{M,j}(e^{j\frac{2\pi}{N_t}k}) \end{bmatrix}$ The metrics weighting (MW) for signal j denoted by $MW_j(k)$ are equal to the inverse of $\Sigma_{H,j,k}$.

$$MW_j(k) = 1/\Sigma_{H,j,k} \quad (81.)$$

Each bit composing the symbol $s_{j,k}$ is weighted by $MW_j(k)$.

In summary, in the present case of FIG. 7 a different weight is computed at each tone based on the knowledge of the channel frequency response at each tone, such that the output SNR is maximized at each tone.

Figure 8:
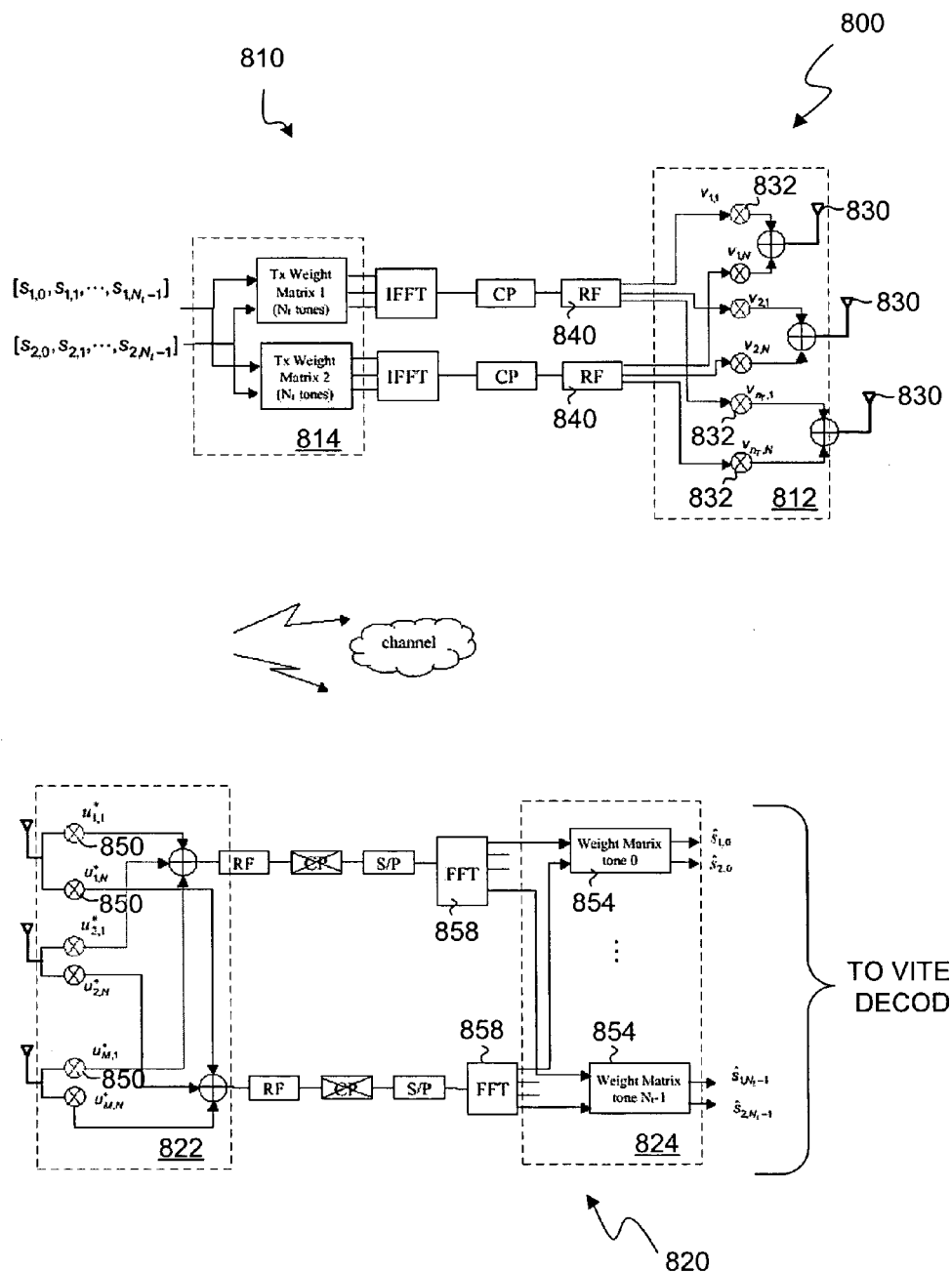
FIG. 8 illustratively represents a transmitter and a receiver structure of a SM-MIMO-OFDM system which each include both RF-based and baseband weighting and combining arrangements.

Next, a case is considered with reference to FIG. 8 in which the spatially received signals are combined in the RF domain, such that the number of receive RF chains required is decreased to the number of spatially-multiplexed transmitted signals. This type of an arrangement is believed to permit cost-effective implementation.

FIG. 8 illustratively represents a communication system 800 including a transmitter 810 and a receiver 820, each of which each includes both RF-based and baseband weighting and combining arrangements. Specifically, the transmitter 810 includes an RF weighting and combining arrangement 812 and a baseband weighting and combining arrangement 814, and the receiver 820 includes an RF weighting and combining arrangement 822 and a baseband weighting and combining arrangement 824. As shown, the transmitter 810 is composed of $n_T$ transmit antenna elements 830, each of which conveys a weighted combination of N distinct sub-streams (i.e. spatially-multiplexed signals) and uses OFDM modulation. Since at least a portion of the combining weights are realized as RF elements 832 within the transmitter 810, the number of transmit RF chains 840 is advantageously reduced to the number of spatially-multiplexed signals.

In the configuration of FIG. 8, the transmit signal at tone k from the $j^{th}$ antenna 830 is:

$$txs_{j,k} = \sum_{i=1}^{N} v_{j,i} \cdot s'_{i,k} \quad (82.)$$

where $$s'_{i,k} = \sum_{l=1}^{N} v'_{i,l,k} \cdot s_{l,k} \quad (83.)$$

where the terms v and v' represent the RF and baseband weights, respectively.

The transmit vector at tone k is $$\underline{txs}_k = V \cdot V'_k \cdot \underline{s}_k \quad (84.)$$

where V is the transmit RF weight matrix of size $n_T \times N$ and is independent of the index k (as it is constant over the frequency tones), and where $V'_k$ is the transmit baseband weight matrix of size $N \times N$ and is dependent upon on the index k (as it is a function of frequency).

In order to simplify the above example, we consider that $V'_k$ is equal to the identity matrix at each tone. It is to be understood that in other embodiments, $V'_k$ can be a matrix other than the identity matrix. For example, when $V'_k$ is dependent upon the channel, various "precoding" methods and the like can assist in the computation of $V'_k$ given a specific criterion to optimize. In this case, the transmit vector at tone k becomes $$\underline{txs}_k = V \cdot \underline{s}_k$$

$$= \sum_{i=1}^{N} \underline{v}_i \cdot s_{i,k}$$

To preserve the total transmit power, the constraint on the matrix V is written as:

$$trace(V^H V) = n_T \quad (85.)$$

assuming that $$\sigma_s^2 = E[s_{i,k} s_{i,k}^*] = P/n_T, i=1, \ldots, N$$

As mentioned above, the receiver 820 of FIG. 8 also utilizes distinct RF and baseband weighting and combining arrangements. Specifically, a first set of weights 850 for the RF-based arrangement 822 are implemented at RF and are common to all tones, while a second set of weights 854 are utilized within the baseband arrangement 824. Note that the step of computing the RF weights 850 may also be carried out in baseband, in which case the values of the weights 850 are fed back to the RF domain via an internal bus, creating a feedback delay.

In this configuration, the output at the FFT 858 at tone k for the $i^{th}$ receive chain is given by $$r_{i,k} = \underline{u}_i^H H_k \cdot V \cdot \underline{s}_k + \underline{u}_i^H \underline{n}_k \quad (86.)$$

$$r_{i,k} = \underline{u}_i^H H_k \cdot \underline{v}_i \cdot s_{i,k} + \underline{u}_i^H \left( \sum_{j \neq i}^{N} H_k \cdot \underline{v}_j \cdot s_{j,k} + \underline{n}_k \right) \quad (87.)$$

where $\underline{u}_i = [u_{1,i}, \ldots, u_{M,i}]^T$. We collect the received signals from each receive chain in a N-dimensional vector. The received vector at tone k becomes:

$$\underline{r}_k = U^H (H_k \cdot V \cdot \underline{s}_k + \underline{n}_k) = U^H H_k \cdot V \cdot \underline{s}_k + U^H \underline{n}_k \quad (88.)$$

where $U = [\underline{u}_1, \ldots, \underline{u}_N]$ is an M×N matrix containing the set of weights implemented at RF. The size of the received vector $\underline{r}_k$ is now reduced to N×1.

Expression (88) can also be written as:

$$\underline{r}_k = H_k^n \cdot \underline{s}_k + \underline{\eta}_k \quad (89.)$$

where $H_k^n = U^H H_k \cdot V$ and $\underline{\eta}_k = U^H \underline{n}_k$.

The received signal model in (87) is composed of N signal components and a noise component. Since the transmitter 810 broadcasts N spatially-multiplexed signals in parallel and each of these signals have to be detected individually by the receiver 820, each receiver chain considers one spatially-multiplexed signal as the desired signal component while the remaining N-1 spatially-multiplexed signals are considered as interferers. Stating that the $i^{th}$ receive chain considers the $i^{th}$ spatially-multiplexed signal as the desired signal component, we rewrite (87) as $$r_{i,k} = \underline{u}_i^H H_k \underline{v}_i \cdot s_{i,k} + \underline{u}_i^H \underline{\mu}_{i,k} \quad (90.)$$

where μ is considered as the noise plus interference signal.

In this embodiment, the RF weight vectors $\underline{u}_i$ and $\underline{v}_i$ are designed to maximize the SNR (while the baseband weights 854 cancel the interference created by the multiple spatially-multiplexed signals). The SNR on the $i^{th}$ receive chain is expressed as $$SNR_{i,k} = \sigma_s^2 \frac{\underline{u}_i^H H_k \cdot \underline{v}_i \cdot \underline{v}_i^H H_k^H \underline{u}_i}{\sigma^2 \underline{u}_i^H \underline{u}_i} \quad (91.)$$

The sum of the individual SNRs across all tones for the i-th receive chain is then $$\overline{SNR}_i = \sum_{k=0}^{N_t-1} SNR_{i,k} \quad (92.)$$

$$= \sigma_s^2 \frac{\underline{u}_i^H \left( \sum_{k=0}^{N_t-1} H_k \cdot \underline{v}_i \cdot \underline{v}_i^H H_k^H \right) \underline{u}_i}{\sigma^2 \underline{u}_i^H \underline{u}_i}$$

which can be alternatively written as:

$$\overline{SNR}_i = \sigma_s^2 \frac{\underline{v}_i^H \left( \sum_{k=0}^{N_t-1} H_k^H \cdot \underline{u}_i \cdot \underline{u}_i^H H_k \right) \underline{v}_i}{\sigma^2 \underline{u}_i^H \underline{u}_i} \quad (93.)$$

Solving equations (92) and (93) for $\underline{u}_i$ and $\underline{v}_i$ for i=1, ..., N, is a joint problem, which is capable of being solved by, for example, using a numerical search. The solution for $\underline{u}_i$ which maximizes $\overline{SNR}_i$ for a given $\underline{v}_i$ is given by the eigenvector of the matrix $$\left( \sum_{k=0}^{N_t-1} H_k \cdot \underline{v}_i \cdot \underline{v}_i^H H_k^H \right)$$

corresponding to the largest eigenvalue. We formulate the solution as:

$$\underline{u}_i = eig \left( \lambda_{\max}, \sum_{k=0}^{N_t-1} H_k \cdot \underline{v}_i \cdot \underline{v}_i^H H_k^H \right), \quad i = 1, \cdots, N \quad (94.)$$

Meanwhile, the solution for $\underline{v}_i$ which maximizes $\overline{SNR}_i$ for a given $\underline{u}_i$ is given by the eigenvector of the matrix $$\left( \sum_{k=0}^{N_t-1} H_k^H \cdot \underline{u}_i \cdot \underline{u}_i^H H_k \right)$$

corresponding to the largest eigenvalue. We formulate the solution as:

$$\underline{v}_i = eig \left( \lambda_{\max}, \sum_{k=0}^{N_t-1} H_k^H \cdot \underline{u}_i \cdot \underline{u}_i^H H_k \right), \quad i = 1, \cdots, N \quad (95.)$$

To detect the transmitted signals, the received vector is then multiplied at each tone by the complex conjugate of an N×N matrix denoted by $W_k$. The resulting output signal at tone k is given by $$\underline{y}_k = W_k^H \underline{r}_k = W_k^H H_k^n \cdot \underline{s}_k + W_k^H \underline{\eta}_k = W_k^H U^H (H_k \cdot V \cdot \underline{s}_k + \underline{n}_k) \quad (96.)$$

Note that while the weights $W_k$ are a function of the applicable frequency tone, the RF weights U and V are common to all tones (and therefore have no dependency on subscript k). $\underline{y}_k = [y_{1,k}, \ldots, y_{N,k}]^T$ a N-dimensional vector is the estimate of $\underline{s}_k = [s_{1,k}, \ldots, s_{N,k}]^T$.

Equation (96) may be solved for $W_k$ using, for example, the well-known minimum mean squared error (MMSE) solution (i.e., the Wiener-Hopf solution). See, e.g., S. Haykin, Adaptive Filter Theory, $3^{rd}$ Ed., Prentice Hall, 1996. The general solution is given by $$W_k = (H_k^n R_{s,k} H_k^{nH} + R_{\eta,k})^{-1} H_k^H R_{s,k} \quad (97.)$$

We have $R_{s,k}=\sigma_s^2 I_N$ and $R_{\eta,k}=E[\underline{\eta}_k\underline{\eta}_k^H]=\sigma^2 U^H U$, thus $$W_k = \left(H_k'' H_k''^H + \frac{\sigma^2}{\sigma_s^2} U^H U\right)^{-1} H_k'' \quad (98.)$$

$W_k$ is derived directly from the knowledge of matrices $H_k$, U and V, where U and V are given by equations (94) and (95).

The computation of the metric weighting for use in Viterbi decoding proceeds as follows:

The error signal j at tone k is expressed as:

$$e_j(k)=s_{j,k}-\underline{w}_{k,j}^H \cdot \underline{r}_k \quad (99.)$$

The MSE—or post-combining noise variance—is thus $$\Sigma_{H,j,k}=E|e_j(k)|^2=(s_{j,k}-\underline{w}_{k,j}^H \cdot \underline{r}_k)\cdot(s_{j,k}^*-\underline{r}_k^H \underline{w}_{k,j}) \quad (100.)$$

The metrics weighting (MW) for signal j denoted by $MW_j(k)$ are equal to the inverse of $\Sigma_{H,j,k}$.

$$MW_j(k)=1/\Sigma_{H,j,k} \quad (101.)$$

Each bit composing the symbol $s_{j,k}$ is weighted by $MW_j(k)$.

The above results were illustrated for the case of an OFDM modulation scheme, where frequency-selective fading is expressed in discrete form on each tone. However, for single carrier systems, the propagation channel can be expressed as a continuous function of frequency. In this case the above results can be generalized to an integral over the bandwidth of the signal, rather than the sum of the $N_t$ discrete components over the bandwidth of the channel.

Figure 9:
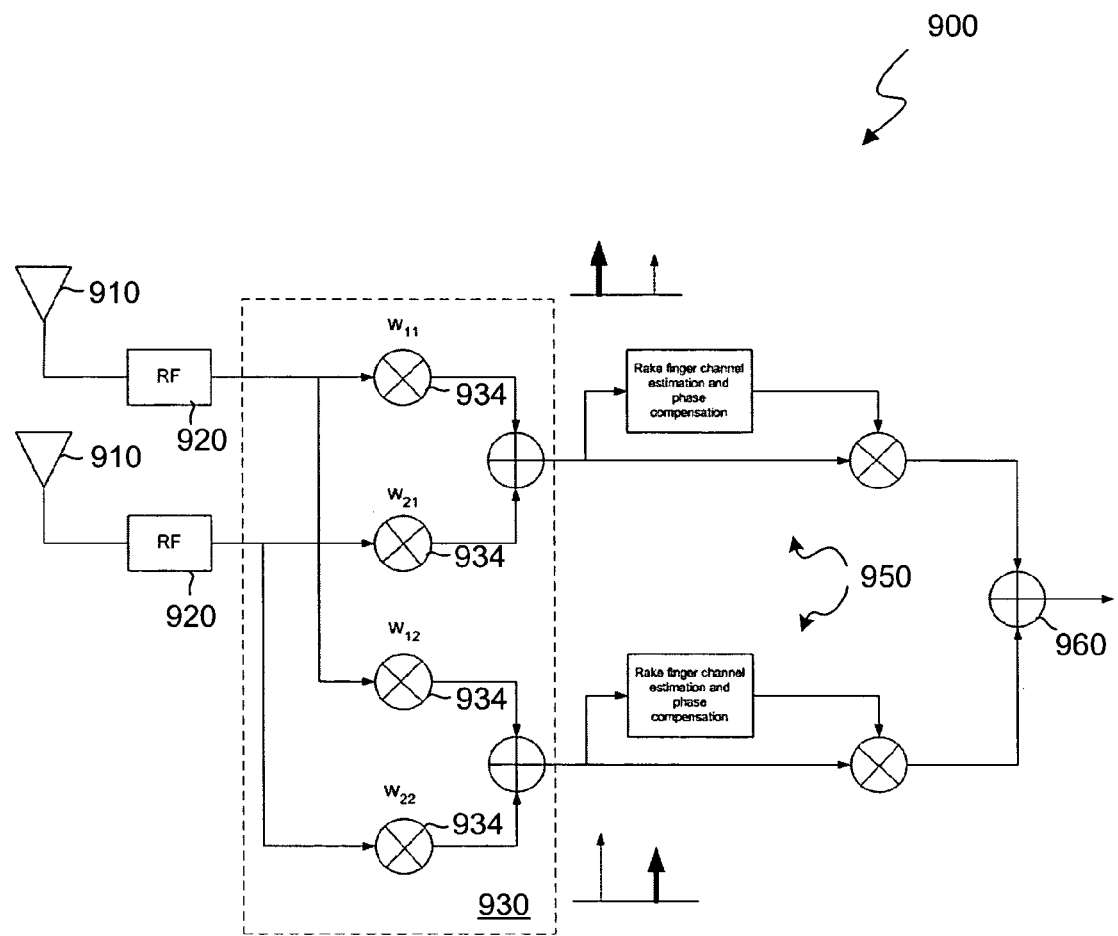
FIG. 9 depicts a space-time direct sequence spread spectrum (DSSS) Rake receiver structure configured with multiple receive antennas and incorporating a baseband weighting and combining arrangement.

Next, a case for a system based on direct sequence spread spectrum processing in the spatial and temporal domains is presented with reference to FIG. 9. This may be considered to extend the space-frequency domain cases described above to the context of space-temporal domain processing.

FIG. 9 depicts a Rake receiver structure 900 configured with receive antennas 910 and incorporating a baseband weighting and combining arrangement 930. Signals received by the antennas 910 are demodulated and down-converted within RF chains 920. Consistent with the invention, such a baseband weighting and combining arrangement 930 may be incorporated within Rake receiver structures which also contain RF-based weighting and combining arrangements (see, e.g., FIG. 10 and the accompanying discussion). In this way a portion of the requisite weighting and combining is performed within the RF domain and the balance at baseband.

In the exemplary case of FIG. 9, the values of the baseband weighting elements 934 are computed over the dimensions of both space and time. At the receiver 900, multipath signals received by a set of N receive antennas 910 (i=1 to N) from over a set of M different delay paths (j=1 to M), may be represented as $$r_{ij}=A_{ij}e^{j\phi_{ij}}\cdot x \cdot p + n_{ij} = A_{ij}e^{j\phi_{ij}}\cdot s + n_{ij} \quad (102.)$$

where $A_{ij}$ are the fading signal envelopes; $\phi_{ij}$ are the corresponding phases; x is the transmitted signal (data symbols); p is the spreading sequence and the $n_{ij}$'s are the additive white Gaussian noise (AWGN) components. The following is the space-time matrix form representation given by $$R = H \cdot s + N \quad (103.)$$

where $\underline{H}$ represents the N×M channel gain matrix $$H = \begin{bmatrix} h_{11} & h_{12} & \ldots & h_{1M} \\ h_{21} & h_{22} & \ldots & h_{2M} \\ \vdots & \vdots & \ldots & \vdots \\ h_{N1} & h_{N1} & \ldots & h_{NM} \end{bmatrix} \quad (104.)$$

$$= [\underline{h}_1 \ \underline{h}_2 \ \ldots \ \underline{h}_M]$$

At each delay j the signal vector is $$\underline{r}_j = \underline{h}_j \cdot s + \underline{n}_j \quad (105.)$$

In the case of baseband combining, vector $\underline{r}_j$ is multiplied by the complex weight vector $\underline{w}_j^H$ $$y_j = \underline{w}_j^H \underline{r}_j = \underline{w}_j^H \underline{h}_j \cdot s + \underline{w}_j^H \underline{n}_j \quad (106.)$$

The corresponding output SNR, assuming the Gaussian approximation for simplification (i.e., the interference and noise component is uncorrelated and of equal power across receive antennas) is $$SNR_j = \frac{\sigma_s^2}{\sigma^2} \frac{\underline{w}_j^H \underline{h}_j \underline{h}_j^H \underline{w}_j}{\underline{w}_j^H \underline{w}_j} \quad (107.)$$

where $\sigma_s^2 = E[ss^*]$ and $\sigma^2 = E[n_{ij}n_{ij}^*]$.

In a noise-limited scenario, the weight maximizing the output SNR in this case is $$\underline{w}_j = \underline{h}_j \quad (108.)$$

The corresponding SNR (before de-spreading) is $$SNR_j = \frac{\sigma_s^2}{\sigma^2} \frac{\underline{h}_j^H \underline{h}_j \underline{h}_j^H \underline{h}_j}{\underline{h}_j^H \underline{h}_j} \quad (109.)$$

$$= \frac{\sigma_s^2}{\sigma^2} \underline{h}_j^H \underline{h}_j$$

$$= \frac{\sigma_s^2}{\sigma^2} \sum_{i=1}^{N} |h_{ij}|^2$$

This corresponds to the Maximum Ratio Combining (MRC) solution, where the output SNR is the sum of individual SNRs at a particular delay over multiple antenna elements.

Furthermore, each of the M fingers 950 of the Rake receiver separates and de-spreads the signals at a given delay as follows:

$$u_j = y_j \cdot p \quad (110.)$$

$$= \underline{h}_j^H \underline{h}_j \cdot s \cdot p + \underline{h}_j^H \underline{n}_j \cdot p$$

$$= G \cdot \underline{h}_j^H \underline{h}_j \cdot x + \underline{h}_j^H \underline{n}_j$$

The corresponding SNR (after de-spreading) is $$SNR_j = G \frac{\sigma_x^2}{\sigma^2} \underline{h}_j^H \underline{h}_j = G \frac{\sigma_x^2}{\sigma^2} \sum_{i=1}^{N} |h_{ij}|^2 \quad (111.)$$

where G is the processing gain and $\sigma_x^2 = E[xx^*]$;

Finally, the Rake combiner 960 optimally combines, using the MRC metric, fingers at different delays $$SNR_z = \sum_{j=1}^{M} SNR_j = G\frac{\sigma_x^2}{\sigma^2}\sum_{i=1}^{N}\sum_{j=1}^{M}|h_{ij}|^2 \quad (112.)$$

Figure 10:
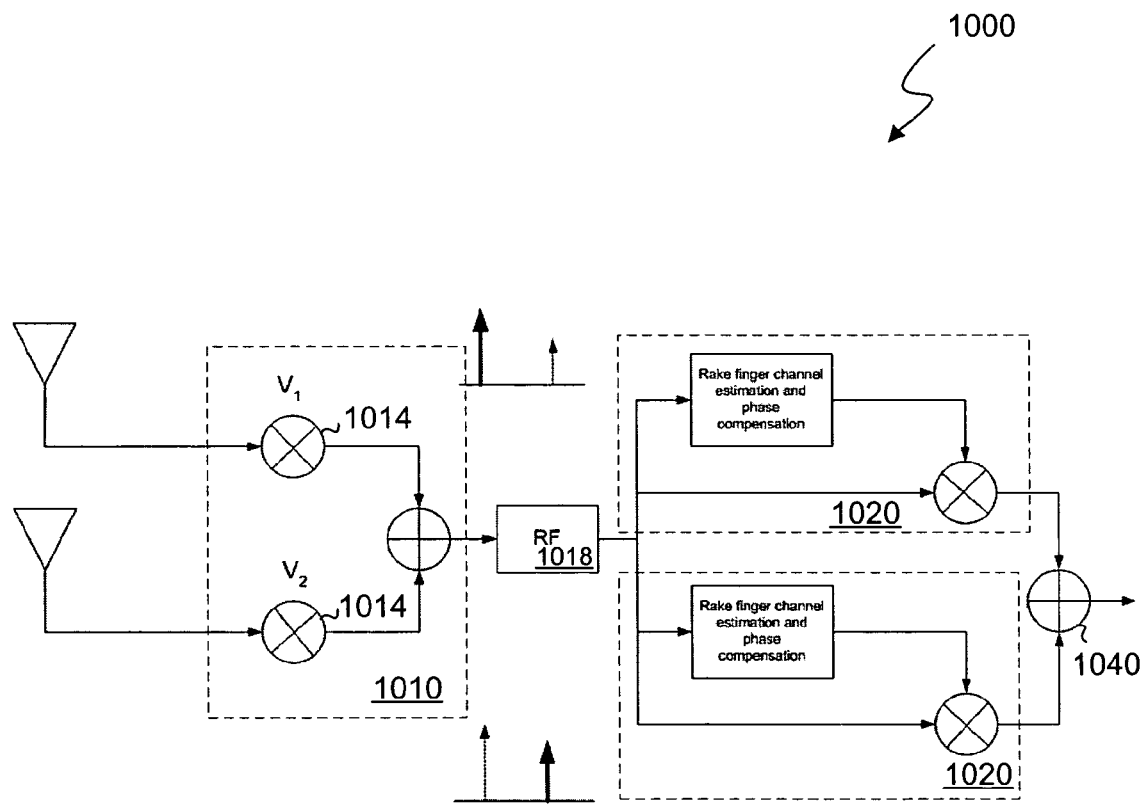
FIG. 10 depicts a space-time direct sequence spread spectrum (DSSS) receiver structure configured with multiple receive antennas and containing an RF weighting and combining arrangement.
Figure 11:
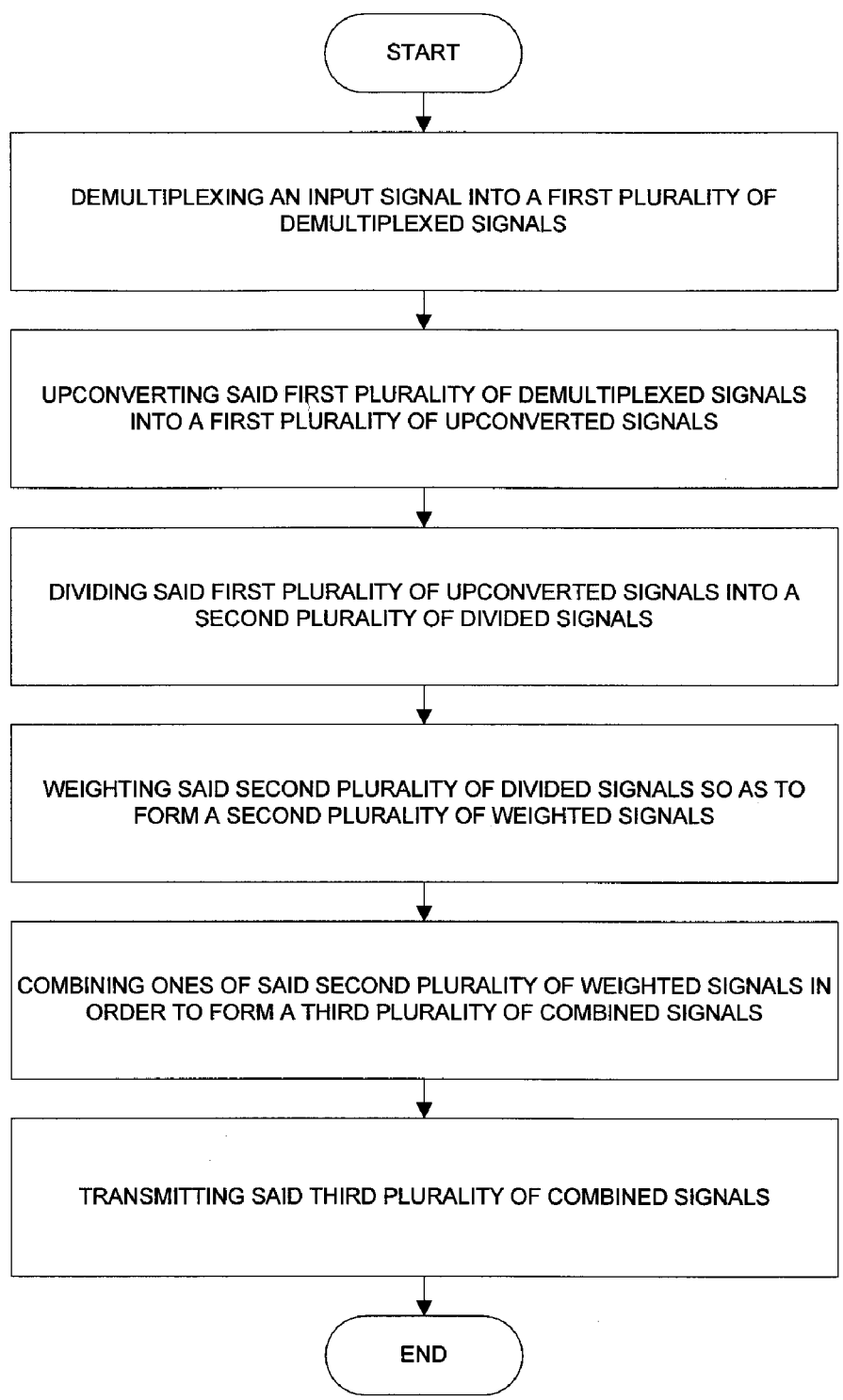
FIG. 11 shows a flowchart illustrating an embodiment of a communication method according to some aspects of the present invention.

FIG. 10 depicts a space-time direct sequence spread spectrum (DSSS) receiver 1000 which contains an RF weighting and combining arrangement 1010. As shown, the RF weighting and combining arrangement 1010 feeds an RF chain 1018, which effects demodulation and down-conversion to baseband. In the exemplary implementation the weighting values 1014 for the combining arrangement 1010 may be expressed as a one-dimensional vector that is applicable to all fingers 1020 of the Rake receiver 1000. The computation step may be carried out in baseband, in which case the values of the weights 1014 are fed back to the RF weighting and combining arrangement 1010 via an internal bus (not shown).

In alternate implementations the RF-based weighting and combining arrangement 1010 within the receiver structure of FIG. 10 may be complemented by a baseband weighting and combining arrangement. This results in a portion of the requisite weighting and combining being performed in the RF domain and the balance being effected at baseband.

As in the baseband-combining case of FIG. 9, at each delay j the signal vector can be represented as $$\underline{r}_j = \underline{h}_j \cdot s + \underline{n}_j \quad (113.)$$

With smart antenna combining, vector $\underline{r}_j$ is multiplied by a complex weight vector $\underline{v}^H$ to obtain $$y_j = \underline{v}^H \underline{r}_j = \underline{v}^H \underline{h}_j \cdot s + \underline{v}^H \underline{n}_j \quad (114.)$$

The corresponding SNR at each delay j is $$SNR_j = \frac{\sigma_s^2}{\sigma^2}\frac{\underline{v}^H \underline{h}_j \underline{h}_j^H \underline{v}}{\underline{v}^H \underline{v}} \quad (115.)$$

where $\sigma_s^2 = E[ss^*]$ and $\sigma^2 = E[n_{ij}n_{ij}^*]$. Next we maximize the sum of SNRs (where the sum is taken across all RAKE fingers):

$$SNR = \sum_{j=1}^{M} SNR_j = \frac{\sigma_s^2}{\sigma^2}\frac{\underline{v}^H HH^H \underline{v}}{\underline{v}^H \underline{v}} \quad (116.)$$

We recognize the standard eigenvalue decomposition problem in Equation (116)

$$\frac{\underline{v}^H HH^H \underline{v}}{\underline{v}^H \underline{v}} = \lambda_{max} \quad (117.)$$

and $$HH^H \underline{v} = \lambda_{max}\underline{v} \quad (118.)$$

Therefore, the SNR maximizing weight vector $\underline{v}$ is the eigenvector corresponding to the strongest eigenvalue of $HH^H$.

Next, we show that the solution for $\underline{v}$ given in Equation (118) effectively maximizes the SNR at the output of the Rake combiner 1040. After de-spreading, the Rake combiner combines the signals at delays captured by Rake fingers 1020, using MRC metrics. We proceed by rewriting equation (114) to reflect the case of a single delay j $$y_j = \underline{v}^H \underline{r}_j = \underline{v}^H \underline{h}_j \cdot s + \underline{v}^H \underline{n}_j \quad (119.)$$

We substitute $\kappa_j = \underline{v}^H \underline{h}_j$ and $\eta_j = \underline{v}^H \underline{n}_j$ and obtain $$y_j = \kappa_j \cdot s + \eta_j \quad (120.)$$

and $$SNR_j = \frac{\kappa_j s \cdot s^* \kappa_j^H}{\eta_j \eta_j^H} = \frac{\sigma_s^2}{\sigma_{\eta_j}^2}|\kappa_j|^2 \quad (121.)$$

We define vector $\underline{y}$, $\underline{\kappa}$ and $\underline{\eta}$ at multiple delays j=1 to M $$\underline{y} = \begin{bmatrix} y_1 \\ y_2 \\ \vdots \\ y_M \end{bmatrix}; \quad \underline{\kappa} = \begin{bmatrix} \kappa_1 \\ \kappa_2 \\ \vdots \\ \kappa_M \end{bmatrix}; \quad \underline{\eta} = \begin{bmatrix} \eta_1 \\ \eta_2 \\ \vdots \\ \eta_M \end{bmatrix} \quad (122.)$$

The Rake receiver 1000 coherently combines elements of $\underline{y}$ to obtain $$z = \underline{\xi}^H \underline{y} = \underline{\xi}^H \underline{\kappa} \cdot s + \underline{\xi}^H \underline{\eta} \quad (123.)$$

The weights are $\underline{\xi} = \underline{\kappa}$ so that $$z = \underline{\kappa}^H \underline{\kappa} \cdot s + \underline{\kappa}^H \underline{\eta} = \sum_{j=1}^{M}|\kappa_j|^2 \cdot s + \underline{\kappa}^H \underline{\eta} \quad (124.)$$

The corresponding SNR of output z is $$SNR_z = \frac{\sum_{j=1}^{M}|\kappa_j|^2 \cdot s \left(\sum_{j=1}^{M}|\kappa_j|^2 \cdot s\right)^H}{\underline{\kappa}^H \underline{\eta} \underline{\eta}^H \underline{\kappa}} \quad (125.)$$

$$= \frac{\sigma_s^2}{\sigma_\eta^2}\frac{\left(\sum_{j=1}^{M}|\kappa_j|^2\right)^2}{\sum_{j=1}^{M}|\kappa_j|^2}$$

$$= \frac{\sigma_s^2}{\sigma_\eta^2}\sum_{j=1}^{M}|\kappa_j|^2$$

assuming $\sigma_{\eta_j} = \sigma_\eta$ for all j.

By comparing Equation (121) to Equation (125) we conclude that $$SNR_z = \sum_{j=1}^{M} SNR_j \quad (126.)$$

and therefore from Equations (115)-(118) we obtain $$SNR_Z = \sum_{j=1}^{M} SNR_j = \frac{\sigma_s^2}{\sigma^2} \sum_{j=1}^{M} \frac{v^H h_j h_j^H v}{v^H v} = \frac{\sigma_s^2}{\sigma^2} \lambda_{\max} \quad (127.)$$

After de-spreading the final results is $$SNR_z = G \frac{\sigma_x^2}{\sigma^2} \lambda_{\max} \quad (128.)$$

We have thus designed the vector weight v such that the quantity $$\sum_{j=1}^{M} SNR_j$$

is maximized. In view of Equation (126), it has also been shown that these weights maximize the SNR at the output of the Rake combiner 1040 (given the constraint that the vector weight v is constant across all fingers).

The foregoing description, for purposes of explanation, used specific nomenclature to provide a thorough understanding of the invention. However, it will be apparent to one skilled in the art that the specific details are not required in order to practice the invention. In other instances, well-known circuits and devices are shown in block diagram form in order to avoid unnecessary distraction from the underlying invention. Thus, the foregoing descriptions of specific embodiments of the present invention are presented for purposes of illustration and description. They are not intended to be exhaustive or to limit the invention to the precise forms disclosed, obviously many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated. It is intended that the following claims and their equivalents define the scope of the invention.

What is claimed is:

1. A communication method for use by a wireless transceiver, comprising:
   demultiplexing, by a demultiplexer, an input signal into a first plurality of demultiplexed signals;
   weighting and combining, by a first circuit configured to weight and combine in the baseband domain, said first plurality of demultiplexed signals prior to upconverting;
   upconverting, by upconverters, said first plurality of demultiplexed signals into a first plurality of upconverted signals;
   dividing, by dividers, said first plurality of upconverted signals into a second plurality of divided signals;
   weighting, by a second circuit configured to weight, said second plurality of divided signals to form a second plurality of weighted signals, wherein weights used by the second circuitry to weight said second plurality of divided signals are obtained from an eigenvector corresponding to a largest eigenvalue of a cross-correlation matrix;
   combining, by a combiner, ones of said second plurality of weighted signals to form a third plurality of combined signals; and
   transmitting said third plurality of combined signals over a plurality of antennas.

2. The method of claim 1 wherein said third plurality of combined signals are each amplified by a respective amplifier and transmitted by a respective antenna.

3. The method of claim 2 wherein said first plurality of demultiplexed signals are less in number than said plurality of antennas.

4. The method of claim 1 further including converting, by a digital-to-analog converter, said first plurality of demultiplexed signals into analog signals.

5. The method of claim 1 wherein said second plurality of divided signals are RF signals and wherein said weighting and combining are performed within the RF domain.

6. The method of claim 1 wherein each of said first plurality of upconverted signals is divided into a set of signal components equal in number to said third plurality of combined signals.

7. The method of claim 1 wherein said wireless transceiver comprises a MIMO transceiver.

8. The method of claim 1 wherein said wireless transceiver employs OFDM.

9. The method of claim 1 wherein said wireless transceiver employs spread spectrum communication techniques.

10. A wireless communication apparatus, comprising:
    a demultiplexer configured to demultiplex an input signal into a first plurality of demultiplexed signals;
    first circuitry configured to weight and combine, in the baseband domain, said first plurality of demultiplexed signals prior to provision to an upconverter;
    an upconverter configured to upconvert said first plurality of demultiplexed signals into a first plurality of upconverted signals;
    dividing elements configured to divide said first plurality of upconverted signals into a second plurality of divided signals;
    second circuitry configured to weight said second plurality of divided signals so as to form a second plurality of weighted signals, wherein weights used by the second circuitry to weight said second plurality of divided signals are obtained from an eigenvector corresponding to a largest eigenvalue of a cross-correlation matrix; and
    a combiner configured to combine ones of said second plurality of weighted signals in order to form a third plurality of combined signals that is transmitted through an antenna structure.

11. The communication apparatus of claim 10 wherein said third plurality of combined signals are transmitted via a corresponding third plurality of antennas of said antenna structure.

12. The communication apparatus of claim 11 wherein said first plurality of demultiplexed signals are less in number than said third plurality of antennas.

13. The communication apparatus of claim 10 further including a digital-to-analog converter configured to convert said first plurality of demultiplexed signals into analog signals.

14. The communication apparatus of claim 10 wherein said second plurality of divided signals are RF signals and wherein said weighting and combining are performed within the RF domain.

15. The apparatus of claim 10 wherein values of said weighting elements are selected to maximize an output signal-to-noise ratio of a receiver disposed to receive said third plurality of combined signals.

16. The communication apparatus of claim 10 wherein said communication apparatus is part of a MIMO transceiver.

17. The communication apparatus of claim 10 wherein said communication apparatus employs OFDM.

18. The communication apparatus of claim 10 wherein said communication apparatus employs spread spectrum communication techniques.

19. A wireless communication apparatus, comprising:
a demultiplexer configured to demultiplex an input signal into a first plurality of demultiplexed signals;
circuitry configured to weight and combine, in the baseband domain, said first plurality of demultiplexed signals prior to provision to the upconverter;
an upconverter configured to upconvert said first plurality of demultiplexed signals into a first plurality of RF signals; and
an RF processing network configured to perform weighting and combining operations in the RF domain upon said first plurality of RF signals to produce a second plurality of RF signals that is transmitted by an antenna structure, wherein RF processing network performs the weighting operations using weights that are obtained from an eigenvector corresponding to a largest eigenvalue of a cross-correlation matrix,
wherein said RF processing network includes an arrangement of dividing elements configured to divide said first plurality of RF signals into a third plurality of divided RF signals, and
wherein said RF processing network further includes:
an arrangement of weighting elements configured to weight said third plurality of divided RF signals so as to form a third plurality of weighted RF signals;
a combiner arrangement configured to combine ones of said third plurality of weighted RF signals to form said second plurality of RF signals.

20. The apparatus of claim 19 wherein values of said weighting elements are selected to maximize an output signal-to-noise ratio of a receiver disposed to receive said second plurality of RF signals.

21. The apparatus of claim 19 wherein said apparatus is part of a MIMO transceiver.

22. The apparatus of claim 19 wherein said apparatus employs OFDM.

23. The apparatus of claim 19 wherein said apparatus employs spread spectrum communication techniques.

* * * * *